US012563335B2

(12) United States Patent
Yu et al.

(10) Patent No.: US 12,563,335 B2
(45) **Date of Patent: *Feb. 24, 2026**

(54) NOISE CANCELLATION APPARATUS AND METHOD

(71) Applicant: HUAWEI TECHNOLOGIES CO., LTD., Guangdong (CN)

(72) Inventors: Xiaowei Yu, Shenzhen (CN); Fan Fan, Shenzhen (CN); Xiaohong Yang, Shenzhen (CN); Jiang Li, Shenzhen (CN); Yulong Li, Shenzhen (CN); Yangshan Ou, Shenzhen (CN); Jingfan Qin, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 29 days.

This patent is subject to a terminal disclaimer.

(21) Appl. No.: 18/635,035

(22) Filed: Apr. 15, 2024

(65) Prior Publication Data

US 2025/0133328 A1 Apr. 24, 2025

Related U.S. Application Data

(63) Continuation of application No. 17/496,754, filed on Oct. 7, 2021, now Pat. No. 11,962,968, which is a (Continued)

(30) Foreign Application Priority Data

Apr. 16, 2019 (CN) ......................... 201910305445.3

(51) Int. Cl.
*H04R 1/10* (2006.01)
*G10K 11/178* (2006.01)
*H04R 3/00* (2006.01)

(52) U.S. Cl.
CPC ..... *H04R 1/1083* (2013.01); *G10K 11/17815* (2018.01); *G10K 11/17817* (2018.01);
(Continued)

(58) Field of Classification Search
CPC .. H04R 1/1083; H04R 3/005; H04R 2410/05; H04R 2460/01; G10K 11/17815;
(Continued)

(56) References Cited

U.S. PATENT DOCUMENTS 9,881,600 B1 * 1/2018 Shetye ................. H04R 1/1083
2008/0112569 A1 * 5/2008 Asada .............. G10K 11/17833
381/71.1

(Continued)

FOREIGN PATENT DOCUMENTS

CN 101385385 A 3/2009
CN 101753657 A 6/2010
(Continued)

*Primary Examiner* — David L Ton

(57) ABSTRACT

Embodiments of this application disclose a noise cancellation apparatus and method. The noise cancellation apparatus includes a main control unit and a noise cancellation processing circuit. The main control unit determines a noise cancellation parameter based on a noise cancellation level index or a feature value for determining a matching degree between a headset and an ear canal of a user. The noise cancellation processing unit obtains an inverse phase noise of an ambient noise based on the noise cancellation parameter. After the inverse phase noise is mixed with a played downlink audio signal, the ambient noise can be canceled. In addition, because the noise cancellation parameter is determined from a preset noise cancellation parameter library based on the received or autonomously determined noise cancellation level index, instead of being uniformly configured, a noise cancellation level can be flexibly adjusted.

20 Claims, 17 Drawing Sheets

Related U.S. Application Data continuation of application No. PCT/CN2020/073632, filed on Jan. 21, 2020.

(52) U.S. Cl.
CPC ....... *G10K 11/17881* (2018.01); *H04R 3/005* (2013.01); *G10K 2210/3033* (2013.01); *H04R 2410/05* (2013.01); *H04R 2460/01* (2013.01)

(58) Field of Classification Search
CPC ....... G10K 11/17881; G10K 11/17817; G10K 2210/3033
USPC ........................................................ 381/71.9
See application file for complete search history.

(56) References Cited

U.S. PATENT DOCUMENTS

| | | | | |
|---|---|---|---|---|
| 2010/0061564 A1* | 3/2010 | Clemow | G10K 11/17854 | 381/71.11 |
| 2013/0301849 A1* | 11/2013 | Alderson | G10K 11/17881 | 381/71.11 |
| 2014/0044275 A1* | 2/2014 | Goldstein | H04R 1/1083 | 381/71.6 |
| 2014/0079235 A1 | 3/2014 | Lyons | | |
| 2014/0105412 A1* | 4/2014 | Alves | G10K 11/17885 | 381/71.6 |
| 2015/0243271 A1* | 8/2015 | Goldstein | G10K 11/17854 | 381/71.6 |
| 2015/0365761 A1* | 12/2015 | Alderson | G10K 11/17885 | 381/71.6 |
| 2016/0125869 A1* | 5/2016 | Kulavik | G10K 11/17821 | 381/71.1 |
| 2016/0300562 A1* | 10/2016 | Goldstein | G10K 11/17879 | |
| 2017/0200444 A1* | 7/2017 | O'Connell | G10K 11/17833 | |
| 2017/0270905 A1* | 9/2017 | Asada | G10K 11/17833 | |
| 2018/0167715 A1 | 6/2018 | Graylin et al. | | |
| 2018/0192179 A1* | 7/2018 | Liu | G10K 11/178 | |

FOREIGN PATENT DOCUMENTS

| | | | |
|---|---|---|---|
| CN | 104602155 | A | 5/2015 |
| CN | 105122350 | A | 12/2015 |
| CN | 205454027 | U | 8/2016 |
| CN | 106535027 | A | 3/2017 |
| CN | 106941637 | A | 7/2017 |
| EP | 2830324 | A1 | 1/2015 |
| JP | 2006010809 | A | 1/2006 |
| JP | 2008124564 | A | 5/2008 |
| JP | 2011087192 | A | 4/2011 |
| JP | 2015173369 | A | 10/2015 |
| JP | 2016015585 | A | 1/2016 |
| JP | 2016131404 | A | 7/2016 |
| JP | 2018530940 | A | 10/2018 |
| WO | 2016167040 | A1 | 10/2016 |
| WO | 2018119463 | A1 | 6/2018 |

* cited by examiner

NOISE CANCELLATION APPARATUS AND METHOD

CROSS-REFERENCE TO RELATED APPLICATION

This application is a continuation of U.S. patent application Ser. No. 17/496,754, filed on Oct. 7, 2021, which is a continuation of International Application No. PCT/CN2020/073632, filed on Jan. 21, 2020, which claims priority to Chinese Patent Application No. 201910305445.3, filed on Apr. 16, 2019. All of the afore-mentioned patent applications are hereby incorporated by reference in their entireties.

TECHNICAL FIELD

This application relates to the field of multimedia technologies, and in particular, to a noise cancellation apparatus and method.

BACKGROUND

When a user wears a headset to listen to music or make a voice call, when there is an ambient noise, clarity of the music or a voice signal heard by the user is affected. When the ambient noise is severe, the user even cannot clearly hear audio information in the headset. The ambient noise greatly reduces experience of the headset wearer. An objective of an active noise cancellation headset is to make, by using a speaker in the headset, a noise having a similar amplitude and an inverse phase to the ambient noise, to cancel the ambient noise and reduce a noise heard by the headset wearer.

There are many challenges in implementing active noise cancellation by using the headset. On the one hand, the ambient noise is variable and irregular. On the other hand, a degree to which the ambient noise leaks into an ear canal is related to a degree of fitness between the headset and a human ear. However, sizes and shapes of ear canals of different people are different. When different users wear a same headset, degrees of matching between the headset and human ears are different, resulting in different levels of noise leakage.

How to improve a noise cancellation effect of the headset and avoid impact of the external noise on the headset user as much as possible needs to be urgently resolved.

SUMMARY

Embodiments of this application provide a noise cancellation apparatus and method, to improve a noise cancellation effect.

A first aspect of this application provides a noise cancellation apparatus, where the apparatus includes a main control unit (MCU) and a noise cancellation processing circuit. The MCU is configured to determine a target noise cancellation parameter from a noise cancellation parameter library based on a received or determined target noise cancellation level index, where the noise cancellation parameter library includes a correspondence between a noise cancellation level index and a noise cancellation parameter. The noise cancellation processing circuit is configured to obtain a target inverse phase noise based on the target noise cancellation parameter, where the target inverse phase noise is used to reduce or cancel an ambient noise obtained by a reference microphone. The noise cancellation processing circuit is further configured to perform audio mixing processing on a played downlink audio signal and the inverse phase noise to obtain a mixed audio signal, where the mixed audio signal is played by using a speaker.

Because the mixed audio signal includes the inverse phase noise of the ambient noise, when the mixed audio signal and the ambient noise enter an ear canal of a user together, the inverse phase noise can cancel the ambient noise. Because the noise cancellation parameter is determined from the preset noise cancellation parameter library based on the received or autonomously determined noise cancellation level index, instead of being uniformly configured, a noise cancellation level can be flexibly adjusted, thereby improving a noise cancellation effect and user experience. It should be understood that the inverse phase noise may completely cancel the ambient noise, or may partially cancel the ambient noise.

In a possible implementation, the target noise cancellation level index is related to a matching degree between a headset and the ear canal of the user, and the noise cancellation level index is used to indicate the noise cancellation parameter adaptive to the matching degree.

Because the ambient noise is variable and irregular, and sizes and shapes of ear canals of users are different, when different users wear a same headset, degrees of matching between the headset and ear canals of the users are different and degrees to which noises leak into the ear canals are also different. If a noise cancellation solution of the headset is uniformly configured, a noise cancellation effect is not satisfactory. In the noise cancellation apparatus provided in this embodiment of this application, the noise cancellation index is related to the matching degree between the headset and the ear canal of the user (or a degree to which the noise leaks into the ear canal of the user caused by the matching degree). The noise cancellation level is not uniformly set, but can be adaptively determined, so that the different users can obtain optimal noise cancellation experience in different noise environments.

In a possible implementation, the noise cancellation parameter library is obtained based on statistics collection based on relationships between the matching degree and noise cancellation parameters, and the noise cancellation level index reflects a value of the matching degree.

In this embodiment of this application, the correspondence between the noise cancellation level index and the noise cancellation parameter in the noise cancellation parameter library obtained through statistics collection is universal, and a noise cancellation effect is better.

In a possible implementation, the MCU is specifically configured to select the target noise cancellation parameter from the noise cancellation parameter library based on the received target noise cancellation level index set by the user in an input interface.

In a possible implementation, the apparatus further includes: the reference microphone, configured to obtain the ambient noise; and a transceiver, configured to receive the target noise cancellation level index, where the target noise cancellation level index is set by the user in an input interface and transmitted to the transceiver through a wireless link. The MCU is specifically configured to select the target noise cancellation parameter from the noise cancellation parameter library based on the target noise cancellation level index received by the transceiver.

The noise cancellation level is selected by the user based on an effect of the headset, and the noise cancellation parameter corresponding to the noise cancellation level is related to the matching degree between the ear canal of the user and the headset. Therefore, the inverse phase noise obtained by performing processing based on the noise cancellation parameter has a better effect of canceling the ambient noise, the headset has a better active noise cancellation effect, and user experience is better.

In a possible implementation, the apparatus further includes the reference microphone, the speaker, and an error microphone. The MCU or the noise cancellation processing circuit is further configured to determine the target noise cancellation level index based on a matching degree feature value, and the matching degree feature value is used to indicate the matching degree. The MCU is specifically configured to select the target noise cancellation parameter from the noise cancellation parameter library based on the determined target noise cancellation level index. The matching degree feature value is determined by the MCU or the noise cancellation processing circuit based on a relationship between a primary path transfer function PP and a secondary path transfer function SP, where the PP is a transfer function from the reference microphone to the error microphone, and the SP is a transfer function from the speaker to the error microphone.

According to the noise cancellation apparatus provided in this embodiment of this application, the matching degree between the headset and the ear canal of the user is adaptively determined by measuring the matching degree feature value, and target noise cancellation parameters for different users are determined based on matching degrees. In this way, a noise cancellation effect is better and an adaptation degree is higher. In addition, the user does not need to set the noise cancellation level and the noise cancellation parameter, thereby improving user experience.

In a possible implementation, a distance between the error microphone and the speaker is a first distance, a distance between the reference microphone and the speaker is a second distance, and the first distance is less than the second distance.

In a possible implementation, the matching degree feature value is a ratio of the PP to the SP. The MCU or the noise cancellation processing circuit is specifically configured to: when the ratio of the PP to the SP meets a preset condition, determine that a noise cancellation level index corresponding to the preset condition is the target noise cancellation level index.

In this embodiment of this application, it is found that amplitude-frequency responses of PP/SP (the ratio of the PP to the SP) corresponding to different human ears have a relatively clear change rule in a range of 1 kHz to 3 kHz. Therefore, in this embodiment of this application, PP/SP is used as a feature value for recognizing the matching degree.

In a possible implementation, the MCU is specifically configured to: preset N groups of noise cancellation level index value factors L(1) to L(N); and determine i, in the N groups of noise cancellation level index value factors, that enables the PP to be closest to $L(i)\times SP$ as the target noise cancellation level index, where $1\le i\le N$.

In a possible implementation, the noise cancellation processing circuit includes a feed-forward FF filter bank, and the target noise cancellation parameter includes an FF filtering coefficient. The FF filter bank processes the ambient noise based on the FF filtering coefficient to obtain the target inverse phase noise.

In a possible implementation, the noise cancellation processing circuit includes a feed-forward FF filter bank and a feed-backward FB filter bank, and the noise cancellation parameter includes an FF filtering coefficient and an FB filtering coefficient. The FF filter bank processes the ambient noise based on the FF filtering coefficient to obtain a first inverse phase noise. The FB filter bank in the noise cancellation processing circuit processes a noise signal of the error microphone based on the FB filtering coefficient to obtain a second inverse phase noise, where the noise signal of the error microphone is obtained by performing audio mixing on a played downlink audio signal obtained after compensation filtering is performed on the played downlink audio signal and an audio signal obtained by the error microphone. The first inverse phase noise and the second inverse phase noise are superimposed to obtain the target inverse phase noise.

In a possible implementation, the target noise cancellation level index is further used to indicate an equalization parameter adaptive to the matching degree. The MCU is further configured to select a target equalization parameter from an equalization parameter library based on the target noise cancellation level index. The noise cancellation processing circuit is further configured to adjust equalization EQ of the played downlink audio signal based on the target equalization parameter.

The mixed audio signal is played by using the speaker and reaches the ear canal of the user. An audio signal heard by the user undergoes both noise cancellation processing and equalization processing. This not only eliminates impact of the ambient noise, but also compensates for audio distortion caused by leakage, so that the audio signal heard by the user is closer to an original audio signal.

In a possible implementation, the equalization parameter library is obtained through statistics collection based on relationships between the matching degree and equalization parameters, the equalization parameter library includes a correspondence between a noise cancellation level index and an equalization parameter, and the noise cancellation level index reflects the value of the matching degree. An equalization parameter corresponding to a first noise cancellation level index is adaptive to a matching degree corresponding to the first noise cancellation level index.

In a possible implementation, indications of a plurality of noise cancellation level indexes presented in the input interface are non-uniformly arranged, and an interval between indications of adjacent noise cancellation level indexes is related to an adjustment step between noise cancellation levels corresponding to the noise cancellation level indexes.

In a possible implementation, a preset noise cancellation level index is set in the input interface. An interval between adjacent noise cancellation level indexes in a first noise cancellation level range is greater than an interval between adjacent noise cancellation level indexes in a second noise cancellation level range. A noise cancellation level index in the first noise cancellation level range is less than the preset noise cancellation level index, and a noise cancellation level index in the second noise cancellation level range is greater than or equal to the preset noise cancellation level index.

In a possible implementation, the noise cancellation apparatus further includes a bone voiceprint sensor, configured to obtain a bone voiceprint feature of the user. The MCU is further configured to associate the target noise cancellation parameter determined based on the received or determined target noise cancellation level index with the bone voiceprint feature of the user. The MCU is further configured to: determine whether the bone voiceprint feature exists in a historical parameter library, where the historical parameter library includes an association relationship between the bone voiceprint feature and a historical target noise cancellation parameter; and when the bone voiceprint feature exists in the historical parameter library, determine the historical target noise cancellation parameter associated with the bone voiceprint feature as the target noise cancellation parameter.

When a user who has registered a bone voiceprint wears the headset again, the headset may identify the user by using a bone voiceprint feature, and automatically use a noise cancellation parameter, a hear through parameter, or an equalization parameter bound to the user.

In a possible implementation, the noise cancellation apparatus further includes a speech recognition engine, configured to recognize a voice command. The MCU is further configured to: when the speech recognition engine recognizes the voice command, determine the target noise cancellation parameter based on the voice command. Alternatively, the MCU is further configured to: when the speech recognition engine recognizes the voice command, enable or disable a noise cancellation function based on the voice command.

In a possible implementation, the MCU is further configured to determine a target hear through parameter, where the target hear through parameter is related to the matching degree. The noise cancellation processing circuit is further configured to: perform, based on the target hear through parameter, hear through processing on an audio signal obtained by the reference microphone to obtain a compensation audio signal of a useful audio signal, where the audio signal obtained by the reference microphone includes the ambient noise and the useful audio signal; and perform audio mixing processing on the played downlink audio signal, the inverse phase noise, and the compensation audio signal to obtain a mixed audio signal.

The mixed audio signal includes the inverse phase noise used to cancel the ambient noise and the compensation audio signal used to compensate for the useful audio signal attenuated by the headset. In this embodiment of this application, the noise signal is removed based on the noise cancellation parameter, and the useful audio signal attenuated by the headset is compensated based on the hear through parameter. When the noise is removed, the external useful audio signal is retained. An audio signal transparently transmitted to the ear canal of the user is only the useful audio signal, excluding the noise. In this way, the noise cancellation function and a hear through function are provided.

In a possible implementation, the MCU is further configured to determine the target equalization parameter, where the target equalization parameter is related to the leakage degree. The noise cancellation processing circuit is further configured to adjust equalization EQ of the played downlink audio signal based on the target equalization parameter.

In a possible implementation, the apparatus further includes the transceiver, configured to receive an equalization level index, where the equalization level index is set by the user in an application APP and transmitted to the transceiver through the wireless link, and the equalization level index is related to the leakage degree. The MCU is specifically configured to select the target equalization parameter from the equalization parameter library based on the equalization level index.

In a possible implementation, the apparatus further includes the error microphone. The MCU or the noise cancellation processing circuit is further configured to determine the leakage degree based on the matching degree feature value. The MCU or the noise cancellation processing circuit is further configured to determine the equalization level index corresponding to the leakage degree. The MCU is specifically configured to select the target equalization parameter from the equalization parameter library based on the equalization level index, where the matching degree feature value is the ratio of the primary path transfer function PP to the secondary path transfer function SP. An input of the PP is the ambient noise obtained by the reference microphone, and an output of the PP is the audio signal obtained by the error microphone. An input of the SP is the mixed audio signal sent to the speaker, and an output of the SP is the audio signal obtained by the error microphone.

A second aspect of this application provides a noise cancellation apparatus, where the apparatus includes a main control unit MCU and a noise cancellation processing circuit. The MCU is configured to determine a target noise cancellation parameter based on a matching degree feature value, where the matching degree feature value is used to indicate a matching degree between a headset and an ear canal of a user. The noise cancellation processing circuit is configured to obtain a target inverse phase noise based on the target noise cancellation parameter, where the target inverse phase noise is used to reduce or cancel an ambient noise obtained by a reference microphone. The noise cancellation processing circuit is further configured to perform audio mixing processing on a played downlink audio signal and the inverse phase noise to obtain a mixed audio signal, where the mixed audio signal is played by using a speaker. The matching degree feature value is determined by the MCU or the noise cancellation processing circuit based on a relationship between a primary path transfer function PP and a secondary path transfer function SP, where the PP is a transfer function from the reference microphone to an error microphone, and the SP is a transfer function from the speaker to the error microphone.

According to the noise cancellation apparatus provided in this embodiment of this application, the matching degree between the headset and the ear canal of the user is adaptively determined by measuring the matching degree feature value, and target noise cancellation parameters for different users are determined based on matching degrees. In this way, a noise cancellation effect is better and an adaptation degree is higher. In addition, the user does not need to set a noise cancellation level and a noise cancellation parameter, thereby improving user experience.

In a possible implementation, the MCU is specifically configured to select, from a noise cancellation parameter library based on the matching degree feature value, the target noise cancellation parameter corresponding to the matching degree feature value, where the noise cancellation parameter library includes a correspondence between a matching degree feature value and a noise cancellation parameter.

In a possible implementation, the noise cancellation parameter library is obtained through statistics collection based on relationships between the matching degree and noise cancellation parameters.

In a possible implementation, the matching degree feature value is a ratio of the PP to the SP.

In a possible implementation, the apparatus further includes the reference microphone, configured to obtain the ambient noise; the error microphone; and the speaker, configured to play the mixed audio signal.

In a possible implementation, the MCU is further configured to select, from an equalization parameter library based on the matching degree feature value, a target equalization parameter corresponding to the matching degree feature value, where the equalization parameter library includes a correspondence between a matching degree feature value and an equalization parameter.

In a possible implementation, the MCU is further configured to select, from a hear through parameter library based on the matching degree feature value, a target hear through parameter corresponding to the matching degree feature value, where the hear through parameter library includes a correspondence between a matching degree feature value and a hear through parameter.

In a possible implementation, the apparatus further includes a speech recognition engine and a bone voiceprint sensor.

A third aspect of this application provides a noise cancellation apparatus, where the apparatus includes a main control unit and a noise cancellation processing circuit. The main control unit is configured to determine a target noise cancellation level based on a magnitude of an ambient noise obtained by a reference microphone or feature information of an ambient noise. The noise cancellation processing circuit is configured to obtain a target inverse phase noise based on a noise cancellation parameter corresponding to the target noise cancellation level, where the target inverse phase noise is used to reduce or cancel the ambient noise. The noise cancellation processing circuit is further configured to perform audio mixing processing on a played downlink audio signal and the inverse phase noise to obtain a mixed audio signal, where the mixed audio signal is played by using a speaker.

According to a headset provided in this embodiment of this application, a noise cancellation level may be adaptively determined based on a noise status (including a magnitude of a noise or feature information of a noise), so that different users can obtain optimal noise cancellation experience in different noise environments.

In a possible implementation, the apparatus further includes the reference microphone, configured to obtain the ambient noise.

In a possible implementation, the MCU is specifically configured to: when it is determined that the ambient noise is less than a first threshold, disable a noise cancellation function; when it is determined that the ambient noise is greater than or equal to the first threshold and less than a second threshold, determine that the target noise cancellation level is a first noise cancellation level; when it is determined that the ambient noise is greater than or equal to the second threshold and less than a third threshold, determine that the target noise cancellation level is a second noise cancellation level; and when it is determined that the ambient noise is greater than or equal to the third threshold, determine that the target noise cancellation level is a third noise cancellation level. A noise cancellation parameter corresponding to the third noise cancellation level is greater than a noise cancellation parameter corresponding to the second noise cancellation level, and the noise cancellation parameter corresponding to the second noise cancellation level is greater than a noise cancellation parameter corresponding to the first noise cancellation level.

In a possible implementation, the MCU is specifically configured to: obtain the feature information of the ambient noise; disable the noise cancellation function when the feature information is a noise feature in a quiet environment, or determine a target noise cancellation mode that matches the feature information when the feature information is not a noise feature in a quiet environment; and determine a noise cancellation level corresponding to the target noise cancellation mode as the target noise cancellation level.

In a possible implementation, the noise cancellation mode includes at least one of the following: an airplane mode, a subway mode, a street mode, or an indoor mode, where each mode corresponds to one noise cancellation parameter.

In a possible implementation, the apparatus further includes a speech recognition engine, configured to recognize a voice command. The MCU is further configured to: when the speech recognition engine recognizes the voice command, determine the target noise cancellation level based on the voice command.

In a possible implementation, the MCU is further configured to: when the speech recognition engine recognizes the voice command, enable the noise cancellation function, disable the noise cancellation function, or set the noise cancellation mode based on the voice command.

In a possible implementation, the MCU is further configured to determine the target noise cancellation level based on a setting performed by a user in an input interface.

In a possible implementation, the noise cancellation mode further includes an automatic control mode. The MCU is further configured to: when it is determined that the noise cancellation mode is the automatic control mode, determine the target noise cancellation level based on the magnitude of the ambient noise or the feature information of the ambient noise.

In the automatic control mode, a noise cancellation level or a noise cancellation parameter set by the user in the input interface or a voice does not take effect.

A fourth aspect of this application provides a control interface of an application of a noise cancellation headset, where the control interface includes a noise cancellation control switch and a noise cancellation level adjustment module. The noise cancellation level adjustment module includes a plurality of non-uniformly arranged noise cancellation level indexes, and an interval between adjacent noise cancellation level indexes is related to an adjustment step between noise cancellation levels. The noise cancellation control switch is configured to set enabling or disabling of a noise cancellation function of the noise cancellation headset, and the noise cancellation level adjustment module is configured to set a noise cancellation level index, where the noise cancellation level index is used to indicate a noise cancellation level of the noise cancellation headset.

In a possible implementation, the noise cancellation level index includes a preset noise cancellation level index, and an interval between adjacent noise cancellation level indexes in a first noise cancellation level range is greater than an interval between adjacent noise cancellation level indexes in a second noise cancellation level range. A noise cancellation level index in the first noise cancellation level range is less than the preset noise cancellation level index, and a noise cancellation level index in the second noise cancellation level range is greater than or equal to the preset noise cancellation level index.

In a possible implementation, the noise cancellation level index includes a default noise cancellation level index, and the default noise cancellation level index is used to indicate a noise cancellation level of the noise cancellation headset when the noise cancellation headset is initially used.

In a possible implementation, the noise cancellation level adjustment module is in a circular disk shape or in a bar graph shape.

In a possible implementation, the control interface further includes a hear through control switch and a hear through level adjustment module. The hear through control switch is configured to set enabling or disabling of a hear through function of the noise cancellation headset, and the hear through level adjustment module is configured to set a hear through level index, where the hear through level index is used to indicate a hear through parameter of the noise cancellation headset.

In a possible implementation, the control interface further includes a plurality of noise cancellation mode control switches, and one noise cancellation mode control switch is configured to control enabling or disabling of a corresponding noise cancellation mode. The control interface further includes an automatic mode control switch, configured to enable or disable an automatic noise cancellation mode of the noise cancellation headset. When the automatic mode control switch is turned on, the plurality of noise cancellation mode control switches do not take effect.

A fifth aspect of this application provides a noise cancellation headset control method. The method includes: presenting an input interface, and providing a noise cancellation level adjustment module in the input interface, where the noise cancellation level adjustment module includes indications of a plurality of non-uniformly arranged noise cancellation level indexes, and an interval between indications of adjacent noise cancellation level indexes is related to an adjustment step between noise cancellation levels; receiving a switch control signal by using a noise cancellation control switch, where the switch control signal is a signal for setting enabling or disabling of a noise cancellation function of the noise cancellation headset by a user; and receiving, by using the noise cancellation level adjustment module, a setting performed by the user on a noise cancellation level index, where the noise cancellation level index is used to indicate a noise cancellation level of the noise cancellation headset.

In a possible implementation, the method further includes: when the switch control signal is the signal for setting enabling or disabling of the noise cancellation function of the noise cancellation headset by the user, determining the noise cancellation level index based on the setting performed by the user on the noise cancellation level index, and determining a target noise cancellation parameter from a noise cancellation parameter library based on the noise cancellation level index; and obtaining a target inverse phase noise based on the target noise cancellation parameter, where the target inverse phase noise is used to reduce or cancel an ambient noise obtained by a reference microphone.

In a possible implementation, the method further includes: performing audio mixing processing on a played downlink audio signal and the inverse phase noise to obtain a mixed audio signal, where the mixed audio signal is played by using a speaker.

In a possible implementation, the method further includes: sending the switch control signal and the noise cancellation level index to the noise cancellation headset through a wireless link, so that the noise cancellation headset enables or disables a noise cancellation function based on the switch control signal, and adjusts the noise cancellation level of the headset based on the noise cancellation level index.

In a possible implementation, a hear through control switch and a hear through level adjustment module are further provided in the input interface. The method further includes: receiving a second switch control signal by using the hear through control switch, where the second switch control signal is a signal for setting enabling or disabling of a hear through function of the noise cancellation headset by the user; and receiving, by using the hear through level adjustment module, a setting performed by the user on a hear through level index, where the hear through level index is used to indicate a hear through parameter of the noise cancellation headset.

In a possible implementation, an automatic mode control switch and a plurality of noise cancellation scenario mode control switches are further provided in the input interface. The method further includes: receiving a third switch control signal by using the automatic mode control switch, where the third switch control signal is a signal for setting enabling or disabling of an automatic noise cancellation mode of the noise cancellation headset by the user; and receiving, by using any control switch in the plurality of noise cancellation scenario mode control switches, a signal for setting enabling or disabling of a noise cancellation scenario mode corresponding to the any control switch, where when the automatic mode control switch is turned on, the plurality of noise cancellation mode control switches do not take effect.

A sixth aspect of this application provides a noise cancellation headset control apparatus, where the apparatus includes a noise cancellation control switch and a noise cancellation level adjustment module. The noise cancellation level adjustment module is provided with indications of a plurality of non-uniformly arranged noise cancellation level indexes, and an interval between indications of adjacent noise cancellation level indexes is related to an adjustment step between noise cancellation levels. The noise cancellation control switch is configured to set enabling or disabling of a noise cancellation function of a noise cancellation headset. The noise cancellation level adjustment module is configured to set a noise cancellation level index, where the noise cancellation level index is used to indicate a noise cancellation level of the noise cancellation headset.

In a possible implementation, the apparatus further includes: a control module, configured to: when the control module determines that the noise cancellation control switch is set to enable the noise cancellation function of the noise cancellation headset, determine the noise cancellation level index set in the noise cancellation level adjustment module; determine a target noise cancellation parameter from a noise cancellation parameter library based on the noise cancellation level index; and obtain a target inverse phase noise based on the target noise cancellation parameter, where the target inverse phase noise is used to reduce or cancel an ambient noise obtained by a reference microphone.

In a possible implementation, the noise cancellation level index includes a preset noise cancellation level index, and an indication of the preset noise cancellation level index is marked on the noise cancellation level adjustment module. An interval between adjacent noise cancellation level indexes in a first noise cancellation level range is greater than an interval between adjacent noise cancellation level indexes in a second noise cancellation level range. A noise cancellation level index in the first noise cancellation level range is less than the preset noise cancellation level index, and a noise cancellation level index in the second noise cancellation level range is greater than or equal to the preset noise cancellation level index.

In a possible implementation, the noise cancellation level index includes a default noise cancellation level index, and the default noise cancellation level index is used to indicate a noise cancellation level of the noise cancellation headset when the noise cancellation headset is initially used.

In a possible implementation, the control module determines that the noise cancellation level index set in the noise cancellation level adjustment module is the default noise cancellation level index, and sends the default noise cancellation level index to the headset, so that the headset determines the target noise cancellation parameter based on the default noise cancellation level index, and obtains the inverse phase noise based on the target noise cancellation parameter.

In a possible implementation, the noise cancellation level index is further used to indicate a hear through parameter of the noise cancellation headset.

In a possible implementation, the control apparatus further includes a hear through control switch and a hear through level adjustment module. The hear through control switch is configured to set enabling or disabling of a hear through function of the noise cancellation headset, and the hear through level adjustment module is configured to set a hear through level index, where the hear through level index is used to indicate the hear through parameter of the noise cancellation headset.

In a possible implementation, the control apparatus further includes a plurality of noise cancellation scenario mode control switches, where each noise cancellation scenario mode control switch is configured to control enabling or disabling of a corresponding noise cancellation mode. The control interface further includes an automatic mode control switch, configured to enable or disable an automatic noise cancellation mode of the noise cancellation headset. When the automatic mode control switch is turned on, the plurality of noise cancellation scenario mode control switches do not take effect.

A user may set the noise cancellation level index by using the noise cancellation level adjustment module, and use the noise cancellation parameter corresponding to the noise cancellation level index as the target noise cancellation parameter. Alternatively, a user may set the corresponding noise cancellation scenario mode by using each of the plurality of noise cancellation scenario mode control switches, and use a noise cancellation parameter corresponding to the corresponding noise cancellation scenario mode as the target noise cancellation parameter. Alternatively, the automatic noise cancellation mode may be enabled. In this case, the headset autonomously determines a noise cancellation mode or a noise cancellation level by determining a magnitude or feature information of the ambient noise.

A seventh aspect of this application provides a noise cancellation method. The method includes: determining a target noise cancellation parameter from a noise cancellation parameter library based on a received or determined target noise cancellation level index, where the noise cancellation parameter library includes a correspondence between a noise cancellation level index and a noise cancellation parameter; obtaining a target inverse phase noise based on the target noise cancellation parameter, where the target inverse phase noise is used to reduce an ambient noise obtained by a reference microphone; and performing audio mixing processing on a played downlink audio signal and the inverse phase noise to obtain a mixed audio signal.

In a possible implementation, the target noise cancellation level index is related to a matching degree between a headset and an ear canal of a user, and the noise cancellation level index is used to indicate the noise cancellation parameter adaptive to the matching degree.

In a possible implementation, the noise cancellation parameter library is obtained based on statistics collection based on relationships between the matching degree and noise cancellation parameters, and the noise cancellation level index reflects a value of the matching degree.

In a possible implementation, the method further includes: receiving the target noise cancellation level index, where the target noise cancellation level index is set by the user in an input interface and transmitted to a transceiver of the headset through a wireless link; and selecting the target noise cancellation parameter from the noise cancellation parameter library based on the target noise cancellation level index received by the transceiver.

In a possible implementation, the method further includes: determining the target noise cancellation level index based on a matching degree feature value, where the matching degree feature value is used to indicate the matching degree; and selecting the target noise cancellation parameter from the noise cancellation parameter library based on the determined target noise cancellation level index. The matching degree feature value is determined by an MCU or a noise cancellation processing circuit based on a relationship between a primary path transfer function PP and a secondary path transfer function SP, where the PP is a transfer function from the reference microphone to an error microphone, and the SP is a transfer function from the speaker to the error microphone.

In a possible implementation, the matching degree feature value is a ratio of the PP to the SP. The determining the target noise cancellation level index based on a matching degree feature value specifically includes: when the ratio of the PP to the SP meets a preset condition, determining that a noise cancellation level index corresponding to the preset condition is the target noise cancellation level index.

In a possible implementation, the determining the target noise cancellation level index based on a matching degree feature value specifically includes: presetting N groups of noise cancellation level index value factors L(1) to L(N); and determining i, in the N groups of noise cancellation level index value factors, that enables the PP to be closest to $L(i)\times SP$ as the target noise cancellation level index, where $1\le i\le N$.

In a possible implementation, the target noise cancellation parameter includes an FF filtering coefficient, and the obtaining a target inverse phase noise based on the target noise cancellation parameter specifically includes: processing the ambient noise based on the FF filtering coefficient to obtain the target inverse phase noise.

In a possible implementation, the noise cancellation parameter includes an FF filtering coefficient and an FB filtering coefficient. The obtaining a target inverse phase noise based on the target noise cancellation parameter specifically includes: processing the ambient noise based on the FF filtering coefficient to obtain a first inverse phase noise; processing a noise signal of the error microphone based on the FB filtering coefficient to obtain a second inverse phase noise, where the noise signal of the error microphone is obtained by performing audio mixing on a played downlink audio signal obtained after compensation filtering is performed on the played downlink audio signal and an audio signal obtained by the error microphone; and superposing the first inverse phase noise and the second inverse phase noise to obtain the target inverse phase noise.

In a possible implementation, the target noise cancellation level index is further used to indicate an equalization parameter adaptive to the matching degree. The method further includes: selecting a target equalization parameter from an equalization parameter library based on the target noise cancellation level index; and adjusting equalization EQ of the played downlink audio signal based on the target equalization parameter.

In a possible implementation, the equalization parameter library is obtained through statistics collection based on relationships between the matching degree and equalization parameters, and the noise cancellation level index reflects the value of the matching degree. An equalization parameter corresponding to a first noise cancellation level index is adaptive to a matching degree corresponding to the first noise cancellation level index.

In a possible implementation, the method further includes: obtaining a bone voiceprint feature of the user; associating the target noise cancellation parameter determined based on the received or determined target noise cancellation level index with the bone voiceprint feature of the user; determining whether the bone voiceprint feature exists in a historical parameter library, where the historical parameter library includes an association relationship between the bone voiceprint feature and a historical target noise cancellation parameter; and when the bone voiceprint feature exists in the historical parameter library, determining the historical target noise cancellation parameter associated with the bone voiceprint feature as the target noise cancellation parameter.

In a possible implementation, the method further includes: when a speech recognition engine recognizes a voice command, determining the target noise cancellation parameter based on the voice command; or when a speech recognition engine recognizes a voice command, enabling or disabling a noise cancellation function based on the voice command.

In a possible implementation, the method further includes: determining a target hear through parameter, where the target hear through parameter is related to the matching degree; performing, based on the target hear through parameter, hear through processing on an audio signal obtained by the reference microphone to obtain a compensation audio signal of a useful audio signal, where the audio signal obtained by the reference microphone includes the ambient noise and the useful audio signal; and performing audio mixing processing on the played downlink audio signal, the inverse phase noise, and the compensation audio signal to obtain a mixed audio signal.

An eighth aspect of this application provides a noise cancellation method. The method includes: determining a target noise cancellation parameter based on a matching degree feature value, where the matching degree feature value is used to indicate a matching degree between a headset and an ear canal of a user; obtaining a target inverse phase noise based on the target noise cancellation parameter, where the target inverse phase noise is used to reduce or cancel an ambient noise obtained by a reference microphone; and performing audio mixing processing on a played downlink audio signal and the inverse phase noise to obtain a mixed audio signal, where the mixed audio signal is played by using a speaker. The matching degree feature value is determined by an MCU or a noise cancellation processing circuit based on a relationship between a primary path transfer function PP and a secondary path transfer function SP, where the PP is a transfer function from the reference microphone to an error microphone, and the SP is a transfer function from the speaker to the error microphone.

In a possible implementation, the determining a target noise cancellation parameter based on a matching degree feature value specifically includes: selecting, from a noise cancellation parameter library based on the matching degree feature value, the target noise cancellation parameter corresponding to the matching degree feature value, where the noise cancellation parameter library includes a correspondence between a matching degree feature value and a noise cancellation parameter.

In a possible implementation, the matching degree feature value is a ratio of the PP to the SP.

A ninth aspect of this application provides a noise cancellation method. The method includes: determining a target noise cancellation level based on a magnitude of an ambient noise obtained by a reference microphone or feature information of an ambient noise obtained by a reference microphone; obtaining a target inverse phase noise based on a noise cancellation parameter corresponding to the target noise cancellation level, where the target inverse phase noise is used to reduce or cancel the ambient noise; and performing audio mixing processing on a played downlink audio signal and the inverse phase noise to obtain a mixed audio signal, where the mixed audio signal is played by using a speaker.

According to the noise cancellation method provided in this embodiment of this application, a noise cancellation level may be adaptively determined based on a noise status (including a magnitude of a noise or feature information of a noise), so that different users can obtain optimal noise cancellation experience in different noise environments.

In a possible implementation, the method further includes: obtaining the ambient noise.

In a possible implementation, the determining a target noise cancellation level based on a magnitude of an ambient noise obtained by a reference microphone specifically includes: when it is determined that the ambient noise is less than a first threshold, disabling a noise cancellation function; when it is determined that the ambient noise is greater than or equal to the first threshold and less than a second threshold, determining that the target noise cancellation level is a first noise cancellation level; when it is determined that the ambient noise is greater than or equal to the second threshold and less than a third threshold, determining that the target noise cancellation level is a second noise cancellation level; and when it is determined that the ambient noise is greater than or equal to the third threshold, determining that the target noise cancellation level is a third noise cancellation level. A noise cancellation parameter corresponding to the third noise cancellation level is greater than a noise cancellation parameter corresponding to the second noise cancellation level, and the noise cancellation parameter corresponding to the second noise cancellation level is greater than a noise cancellation parameter corresponding to the first noise cancellation level.

In a possible implementation, the determining a target noise cancellation level based on feature information of an ambient noise obtained by a reference microphone specifically includes: obtaining the feature information of the ambient noise; disabling a noise cancellation function when the feature information is a noise feature in a quiet environment, or determining a target noise cancellation mode that matches the feature information when the feature information is not a noise feature in a quiet environment; and determining a noise cancellation level corresponding to the target noise cancellation mode as the target noise cancellation level.

In a possible implementation, the noise cancellation mode includes at least one of the following: an airplane mode, a subway mode, a street mode, or an indoor mode, where each mode corresponds to one noise cancellation parameter.

In a possible implementation, the method further includes: when a speech recognition engine recognizes a voice command, determining the target noise cancellation level based on the voice command.

In a possible implementation, the method further includes: when a speech recognition engine recognizes a voice command, enabling the noise cancellation function, disabling the noise cancellation function, or setting a noise cancellation mode based on the voice command.

In a possible implementation, the method further includes: determining the target noise cancellation level based on a setting performed by a user in an input interface.

In a possible implementation, the noise cancellation mode further includes an automatic control mode, and the method further includes: when it is determined that the noise cancellation mode is the automatic control mode, determining the target noise cancellation level based on the magnitude of the ambient noise or the feature information of the ambient noise.

In the automatic control mode, a noise cancellation level or a noise cancellation parameter set by the user in the input interface or a voice does not take effect.

A tenth aspect of this application provides a computer-readable storage medium. The computer-readable storage medium stores instructions. When the instructions are run on a computer or a processor, the computer or the processor is enabled to perform the method in any one of the seventh aspect or the possible implementations of the seventh aspect.

An eleventh aspect of this application provides a computer-readable storage medium. The computer-readable storage medium stores instructions. When the instructions are run on a computer or a processor, the computer or the processor is enabled to perform the method in any one of the eighth aspect or the possible implementations of the eighth aspect.

A twelfth aspect of this application provides a computer-readable storage medium. The computer-readable storage medium stores instructions. When the instructions are run on a computer or a processor, the computer or the processor is enabled to perform the method in any one of the ninth aspect or the possible implementations of the ninth aspect.

A thirteenth aspect of this application provides a computer program product including instructions. When the computer program product runs on a computer or a processor, the computer or the processor is enabled to perform the method in any one of the seventh aspect or the possible implementations of the seventh aspect.

A fourteenth aspect of this application provides a computer program product including instructions. When the computer program product runs on a computer or a processor, the computer or the processor is enabled to perform the method in any one of the eighth aspect or the possible implementations of the eighth aspect.

A fifteenth aspect of this application provides a computer program product including instructions. When the computer program product runs on a computer or a processor, the computer or the processor is enabled to perform the method in any one of the ninth aspect or the possible implementations of the ninth aspect.

DESCRIPTION OF EMBODIMENTS

Figure 1:
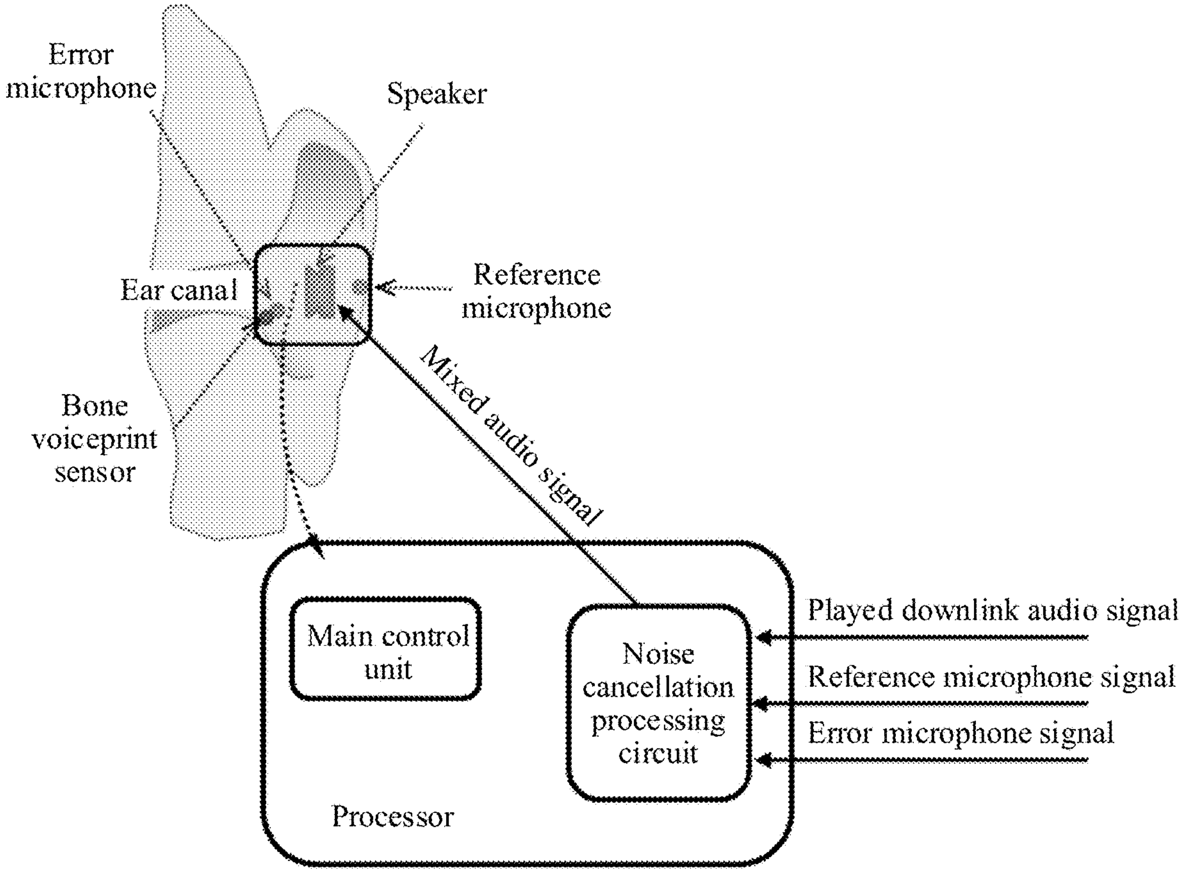
FIG. 1 is a schematic diagram of a structure of an example noise cancellation headset according to an embodiment of this application.

In the specification, claims, and accompanying drawings of this application, the terms “first”, “second”, and the like are intended to distinguish between similar objects but do not necessarily indicate a specific order or sequence. Moreover, the terms “include”, “have”, and any other variants thereof are intended to cover a non-exclusive inclusion, for example, including a series of steps or units. A method, system, product, or device does not need to be limited to those explicitly listed steps or units, but may include other steps or units that are not explicitly listed or that are inherent to the process, method, product, or device.

It should be understood that, in this application, “at least one (item)” means one or more, and “a plurality of” means two or more. The term “and/or” is used to describe an association relationship between associated objects, and indicates that three relationships may exist. For example, “A and/or B” may represent the following three cases: Only A exists, only B exists, and both A and B exist, where A and B may be singular or plural. The character “/” generally indicates an “or” relationship between the associated objects. “At least one of the following items (pieces)” or a similar expression thereof indicates any combination of these items, including a single item (piece) or any combination of a plurality of items (pieces). For example, at least one of a, b, or c may indicate a, b, c, "a and b", "a and c", "b and c", or "a, b, and c", where a, b, and c may be singular or plural.

An active noise cancellation headset emits a noise having a similar amplitude and an inverse phase to an external ambient noise by using a speaker, so that the noise heard by a headset wearer is reduced. Currently, common headsets in the market are in an in-ear form, a semi-in-ear form, an over-ear form (which may also be referred to as a circum-aural form), a supra-aural form, a semi-open form, and the like. In-ear and semi-in-ear headsets with an active noise cancellation function are generally equipped with rubber covers to ensure that the headsets fit well with human ears, thereby physically isolating the ambient noise. Although a relatively good physical isolation effect can be achieved by a headset equipped with a rubber cover, a stethoscope effect (occlusion) usually exists because of a stimulating effect of the rubber cover on an ear canal, which affects wear comfort of a user. A form of a semi-open headset is similar to an earbud. For example, the AirPods headset of the Apple Inc. is an example of the semi-open headset. The semi-open headset generally has no rubber cover, and is more comfortable to wear and is suitable to wear for a long time. However, because the semi-open headset lacks the rubber cover, a noise isolation effect of the semi-open headset is not as good as that of a headset with a rubber cover. In a noisy environment, user experience may be affected.

Embodiments of this application provide a semi-open headset with an active noise cancellation (ANC) function and an ANC method. The semi-open headset with the ANC function has advantages such as comfortable wearing, compactness and portability, and a good anti-noise effect. It should be understood that the ANC method may be further applied to an in-ear headset with a rubber cover, a semi-in-ear headset with a rubber cover, a supra-aural headset with a rubber cover, or the like. This is not limited in the embodiments of this application.

FIG. 1 is a schematic diagram of a structure of an example noise cancellation headset according to an embodiment of this application. Typically, the headset does not fit perfectly into an ear canal, and therefore there are inevitable gaps that are between the headset and the ear canal. An external ambient noise enters the ear canal through the gaps. In addition, because sizes and shapes of ear canals of different users are different, degrees of matching between a same headset and different human ears are different, and noises leaking into the ear canals when the different users wear the same headset are also different. In this embodiment of this application, when a user wears the headset, a degree to which the ambient noise leaks into an ear canal of the user is referred to as a leakage degree. It should be understood that a matching degree between the headset and the ear canal of the user may be reflected by the leakage degree. Different leakage degrees in this embodiment of this application are caused by different degrees of matching between the headset and the ear canal.

The headset includes a speaker, a reference microphone, a main control unit (MCU), and a noise cancellation processing circuit. For example, the noise cancellation processing circuit may be an ANC circuit or a solidified ANC hardware processor core. The MCU and the noise cancellation processing circuit may be integrated on one processor chip, or may be on two independent processor chips. Optionally, the headset may further include an error microphone, a bone voiceprint sensor, and an automatic speech recognition (ASR) engine. The reference microphone is relatively far away from the speaker, and the error microphone is relatively close to the speaker.

It should be understood that the speaker is configured to play a downlink audio signal, so that the audio signal enters the ear canal of the user. For example, the downlink audio signal may be a music signal or a voice signal. A signal collected by the reference microphone is the external ambient noise, a signal collected by the error microphone is a noise-canceled sound at a position close to the speaker. The bone voiceprint sensor is configured to obtain a bone voiceprint of the user to identify an identity of the headset wearer, and the ASR engine is configured to identify a voice command of the user.

When the headset includes only the reference microphone, the noise cancellation processing circuit processes the signal collected by the reference microphone to obtain an inverse phase noise. When the headset includes the reference microphone and the error microphone, the noise cancellation processing circuit processes the signal collected by the reference microphone and the signal collected by the error microphone to generate the inverse phase noise.

Further, the noise cancellation processing circuit is further configured to perform audio mixing on the inverse phase noise and the played downlink audio signal to obtain a mixed audio signal, where the mixed audio signal is transmitted to the speaker for playing and then enters the ear canal of the user.

Because the mixed audio signal includes the inverse phase noise of the ambient noise, when the ambient noise and the mixed audio signal enter the ear canal together, the inverse phase noise in the mixed audio signal is used to cancel the ambient noise. In this way, a sound heard by the user is a noise-canceled sound. It should be understood that the inverse phase noise may partially or completely cancel the ambient noise.

Figure 2:
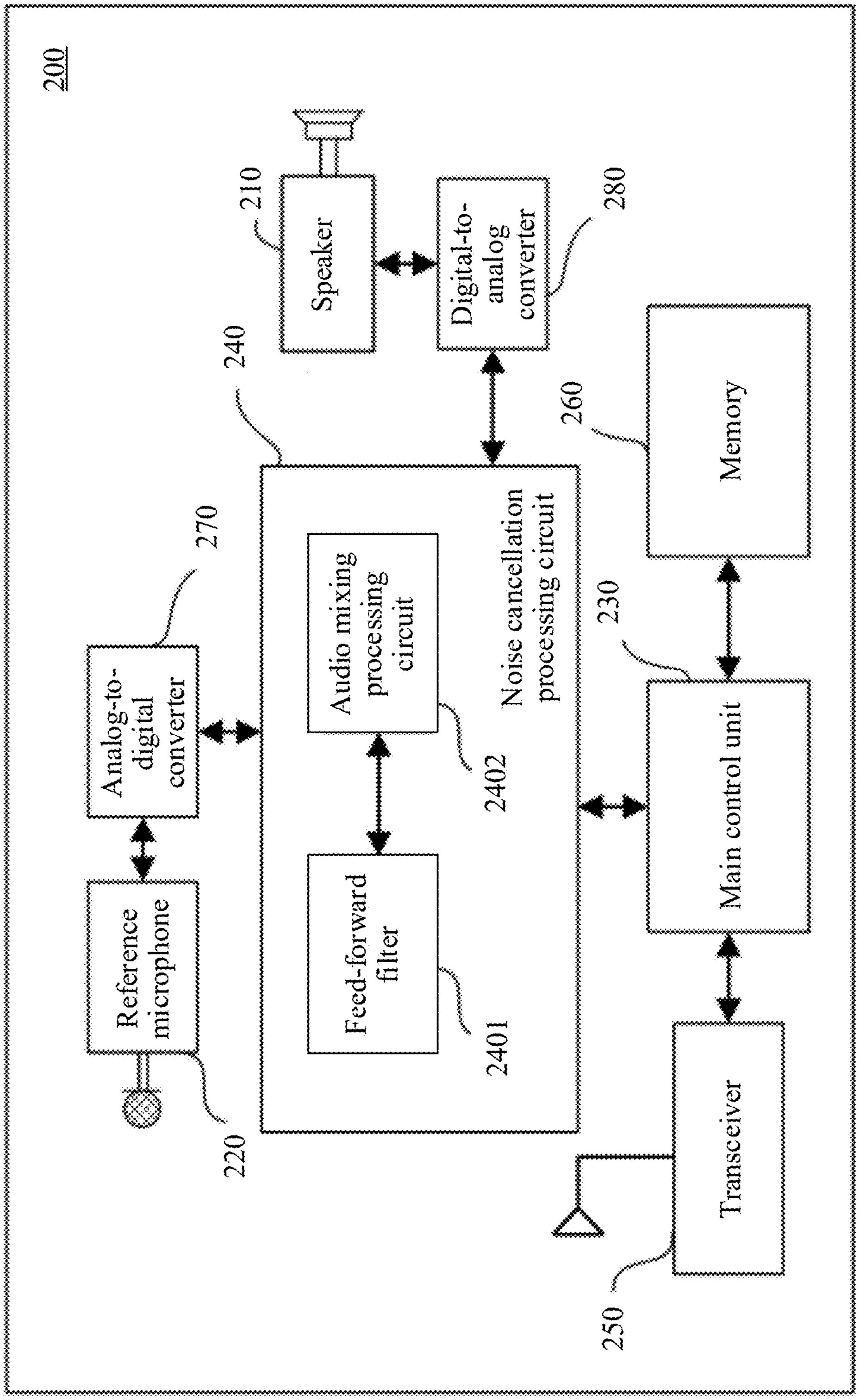
FIG. 2 is a schematic diagram of a structure of another example noise cancellation headset according to an embodiment of this application.

FIG. 2 is a schematic diagram of a structure of an example noise cancellation headset 200 according to an embodiment of this application.

The noise cancellation headset 200 includes a speaker 210, a reference microphone 220, a main control unit 230, a noise cancellation processing circuit 240, and a transceiver 250. The main control unit 230 and the noise cancellation processing circuit 240 may be integrated on a same chip, or may be on two independent processor chips. The transceiver 250 may be a wireless transceiver. In an optional case, the foregoing parts of the headset 200 are coupled by using connectors. It should be understood that, in the embodiments of this application, coupling refers to mutual connection in a specified manner, including indirect connection by using another device or direct connection. For example, the parts may be connected through various interfaces, transmission lines, buses, or the like. These interfaces are usually electrical communication interfaces, but it is not excluded that the interfaces may be mechanical interfaces or interfaces in another form. This is not limited in this embodiment.

The transceiver 250 is configured to receive a target noise cancellation level index, where the target noise cancellation level index is set by a user in an application (Application, APP) and transmitted to the transceiver through a wireless link. For example, the wireless link may be a Bluetooth link. The target noise cancellation level index is used to determine a target noise cancellation level and a target noise cancellation parameter corresponding to the target noise cancellation level, where the target noise cancellation parameter is a noise cancellation parameter that matches a leakage degree to which an ambient noise leaks into an ear canal, in other words, an inverse phase noise obtained after processing based on the target noise cancellation parameter can cancel the external ambient noise to the greatest extent.

In an optional case, the user controls, by using an active noise cancellation APP on an intelligent mobile terminal, enabling or disabling of an active noise cancellation function, and sets the target noise cancellation level by using the APP, where the target noise cancellation level is a noise cancellation level suitable for the leakage degree of the ear canal of the user. For example, the user may select, by adjusting a noise cancellation level adjustment module on the APP, a noise cancellation level index suitable for the user, and transmit the noise cancellation level index to the transceiver of the headset through the Bluetooth link, so that the headset obtains an optimal noise cancellation effect. A value of the noise cancellation level index is related to the leakage degree.

Figure 3:
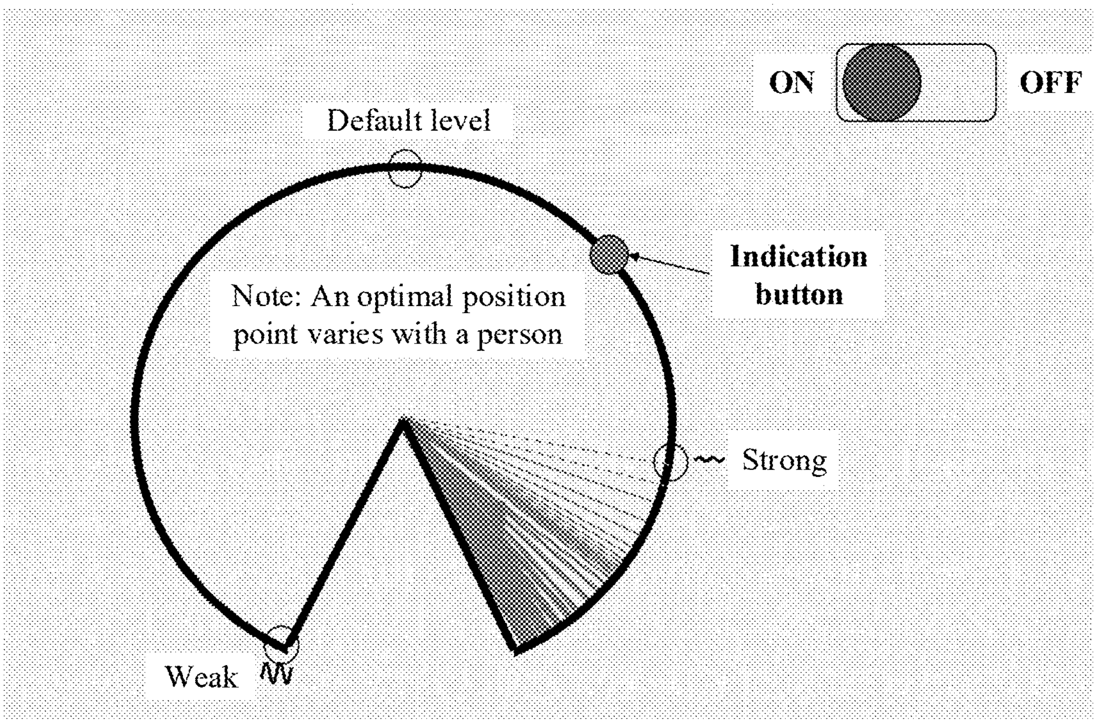
FIG. 3 is an example control interface of an application APP according to an embodiment of this application.

FIG. 3 is an example control interface of an application APP according to an embodiment of this application. In an optional case, the control interface may be considered as a user-oriented input interface or a user-oriented input module, and a plurality of function buttons or function modules are provided in the input interface, so that a user controls a headset or a noise cancellation apparatus by controlling a related function button or function module. The control interface includes a switch control module and a noise cancellation level adjustment circular disk. The switch control module includes two gears "OFF" and "ON". Optionally, an identifier of the gear may alternatively be written in Chinese. For example, two gears "关闭" and "打开" are included. When the switch control module is set to "OFF" or "关闭", an active noise cancellation function of the headset is disabled. When the switch control module is set to "ON" or "打开", the active noise cancellation function of the headset is enabled. Optionally, the control interface includes a text prompt, used to prompt the user that an optimal position point of a noise cancellation effect varies with a person. In an optional case, indications of a plurality of noise cancellation level indexes presented in the control interface of the APP are non-uniformly arranged, and an interval between indications of adjacent noise cancellation level indexes is related to an adjustment step between noise cancellation levels. It should be understood that the indication of the noise cancellation level index is a symbol or a graphic presented in the control interface, for example, may be text symbols "strong" and "weak", or an Arabic numeral symbol; and the indication of the noise cancellation level index is used to identify a corresponding noise cancellation level index.

The noise cancellation level adjustment circular disk includes one indication button. The indication button is used to identify a set target noise cancellation level index. The user may set a noise cancellation level index by rotating a position of the indication button. When the user stops rotating, the APP records a position of the indication button, obtains a noise cancellation level index value corresponding to the position, and sends the noise cancellation level index value to the headset through a Bluetooth link or another wireless link. In an optional case, when the APP is restarted, the indication button stays at a position previously set by the user. Optionally, the noise cancellation level adjustment circular disk includes a default noise cancellation level index. When the APP is started for the first time, the indication button stays at a position corresponding to the default noise cancellation level index. The default noise cancellation level index is used to indicate a noise cancellation level of the noise cancellation headset when the noise cancellation headset is initially used. Distribution of the noise cancellation level indexes on the noise cancellation level adjustment circular disk is uneven, and an interval between two adjacent noise cancellation level indexes reflects a degree of adjustment or an adjustment step between adjacent noise cancellation levels. When the user drags the button on the noise cancellation level adjustment circular disk, an adjustment step between noise cancellation levels changes non-linearly. For example, a total quantity of noise cancellation levels is N, respectively corresponding to index values 1 to N, and any index value M greater than 1 and less than N is selected. In this case, an interval between an index "M−1" and an index "M" is a first interval, and an interval between the index "M" and an index "M+1" is a second interval. Correspondingly, an adjustment step from an M−1 level to an M level is a first step, and an adjustment step from the M level to an M+1 level is a second step. The first interval and the second interval may be equal or different. When the first interval and the second interval are not equal, the first step and the second step are also not equal.

Optionally, the noise cancellation level adjustment circular disk includes a preset noise cancellation level index. The preset noise cancellation level index divides the noise cancellation level adjustment circular disk into two areas: a first area and a second area. A noise cancellation level index in the first area is less than the preset noise cancellation level index, and a noise cancellation level index in the second area is greater than the preset noise cancellation level index. An interval between two adjacent noise cancellation level indexes in the first area is relatively large, and an interval between two adjacent noise cancellation level indexes in the second area is relatively small. In other words, an adjustment step from a current noise cancellation level to a next noise cancellation level in the first area is greater than an adjustment step from a current noise cancellation level to a next noise cancellation level in the second area. For example, the preset noise cancellation level index is a noise cancellation level index identified as "strong". When a noise cancellation level index is less than the noise cancellation level index corresponding to "strong", an interval between adjacent indexes is relatively large, and an adjustment step between noise cancellation levels is relatively large. When the noise cancellation level index is greater than the noise cancellation level index corresponding to "strong", an interval between adjacent indexes is relatively small, and an adjustment step between noise cancellation levels is relatively small. For example, the noise cancellation level adjustment circular disk further includes a noise cancellation level index identified as "weak". When a noise cancellation level index is between the noise cancellation level index corresponding to "weak" and the noise cancellation level index corresponding to "strong", an interval between two adjacent level indexes is relatively large, and an adjustment step between noise cancellation levels is relatively large. When the noise cancellation level index is greater than the noise cancellation level index corresponding to "strong", an interval between two adjacent level indexes is relatively small, and an adjustment step between noise cancellation levels is relatively small.

When a noise cancellation level is lower than a preset level, an adjustment step between the noise cancellation levels is relatively large. When the noise cancellation level is higher than the preset level, an adjustment step between the noise cancellation levels is relatively small. This improves flexibility and accuracy of noise cancellation level adjustment.

Figure 4:
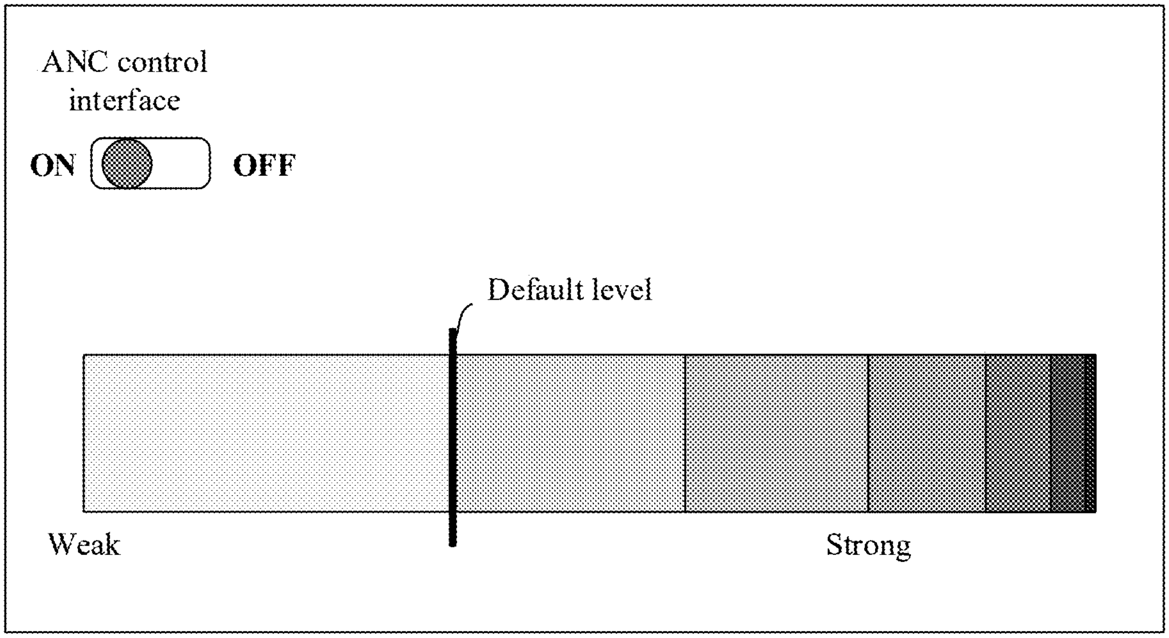
FIG. 4 is another example control interface of an APP according to an embodiment of this application.

In an optional case, a noise cancellation level adjustment module may alternatively be implemented by using a bar graph. FIG. 4 is another example control interface of an APP according to an embodiment of this application. The control interface includes a level switch control module and a noise cancellation level index adjustment bar. For a function of the noise cancellation level index adjustment bar, refer to a function of the noise cancellation level adjustment circular disk in FIG. 3. Details are not described herein again.

The reference microphone 220 is configured to collect the external ambient noise.

The main control unit 230 is configured to select, from a noise cancellation parameter library based on the target noise cancellation level index received by the transceiver 250, the target noise cancellation parameter corresponding to the target noise cancellation level index. For example, the target noise cancellation parameter is a noise cancellation filtering coefficient. The headset further includes a memory 260, and the noise cancellation parameter library is stored in the memory 260. Optionally, the memory may be a memory outside the MCU, or may be a storage unit built in the MCU. For example, the memory is a non-power-off volatile memory, for example, an embedded multimedia card (eMMC), a universal flash storage (UFS), a read-only memory (ROM), a flash memory, or the like. Alternatively, the memory is another type of static memory that may store static information and instructions. The noise cancellation parameter library includes correspondences between noise cancellation level indexes and noise cancellation parameters. For example, the noise cancellation level indexes one-to-one correspond to the noise cancellation parameters. For example, the noise cancellation parameter library includes 64 noise cancellation level indexes in total from an index 1 to an index 64. The noise cancellation parameters include 64 groups of noise cancellation parameters in total from a parameter 1 to a parameter 64. The noise cancellation level index 1 corresponds to the parameter 1, the noise cancellation level index 2 corresponds to the parameter 2, . . . , and the noise cancellation level index 64 corresponds to the parameter 64. It should be understood that the noise cancellation parameter may be a group of parameters, and the group of parameters may include a plurality of filtering coefficients. In an optional case, a plurality of different noise cancellation levels may share a same group of noise cancellation parameters. A value of the noise cancellation level index reflects a magnitude of a leakage degree. A smaller noise cancellation level index indicates a smaller leakage degree and a smaller corresponding noise cancellation strength. A larger noise cancellation level index indicates a large leakage degree and a larger corresponding noise cancellation strength. The noise cancellation parameter corresponding to the noise cancellation level index in the noise cancellation parameter library also reflects the leakage degree. For example, a noise cancellation parameter N corresponding to a noise cancellation level index N matches a leakage degree corresponding to the noise cancellation level index N. For example, the user drags the noise cancellation level adjustment module, to select a noise cancellation level index with a best noise cancellation effect, where the noise cancellation level index with the best noise cancellation effect reflects a degree to which the ambient noise leaks into the headset worn by the user. The MCU selects, from the noise cancellation parameter library based on the noise cancellation level index selected by the user, a corresponding noise cancellation parameter that matches the leakage degree.

In this embodiment of this application, the noise cancellation parameter library is obtained by testing relationships between leakage degrees and noise cancellation parameters when a large quantity of users wear the headset. A correspondence between a noise cancellation level and a noise cancellation parameter in the noise cancellation parameter library is universal, and is valid for most users. For example, in this embodiment of this application, the correspondence between the noise cancellation level and the noise cancellation parameter is obtained by testing features of secondary path feature curves and noise cancellation curves of the headset worn by the large quantity of users. A secondary path transfer function is a transfer function from the speaker of the headset to an error microphone. In other words, an input of the secondary path is a signal of the speaker, and an output of the secondary path is a signal of the error microphone.

Optionally, the main control unit 230 is further configured to write the noise cancellation parameter into a position of a filtering coefficient corresponding to the noise cancellation processing circuit 240, to configure a filter.

The noise cancellation processing circuit 240 is configured to obtain a target inverse phase noise based on the target noise cancellation parameter, where the target inverse phase noise may be used to cancel the external ambient noise.

For example, the noise cancellation processing circuit 240 includes a feed-forward (FF) filter 2401. The target noise cancellation parameter includes a feed-forward filtering coefficient. After obtaining the feed-forward filtering coefficient from the noise cancellation parameter library, the MCU writes the filtering coefficient into a position at which the FF filtering coefficient is stored, and the FF filter 2401 performs, based on the filtering coefficient, filtering processing on the ambient noise collected by the reference microphone to obtain the inverse phase noise.

For example, the noise cancellation processing circuit 240 further includes an audio mixing processing circuit 2402, where the audio mixing processing circuit 2402 is configured to perform audio mixing processing on a played downlink audio signal and the inverse phase noise to obtain a mixed audio signal.

The speaker 210 is configured to transmit the mixed audio signal to the ear canal of the user.

It should be understood that an audio signal processed by the noise cancellation processing circuit is an electrical signal. Optionally, the headset further includes an analog-to-digital converter (ADC) 270 and a digital-to-analog converter (DAC) 280. The ADC 270 is configured to convert the ambient noise collected by the reference microphone from an analog signal to an electrical signal. The mixed audio signal obtained after processing performed by the noise cancellation processing circuit is an electrical signal, and the DAC 280 is configured to convert the mixed audio signal from the electrical signal to an analog mixed audio signal. The speaker 210 is specifically configured to play the analog mixed audio signal.

Because the mixed audio signal includes the inverse phase noise of the ambient noise, when the mixed audio signal and the ambient noise enter the ear canal of the user together, the inverse phase noise can cancel the ambient noise. In addition, because a noise cancellation level is selected by the user based on an effect of the headset, a noise cancellation parameter corresponding to the noise cancellation level is related to the degree to which the ambient noise leaks into the headset worn by the user. An inverse phase noise obtained by performing processing based on the noise cancellation parameter has a better effect of canceling the ambient noise, an active noise cancellation effect of the headset is better, and user experience is better.

Figure 5:
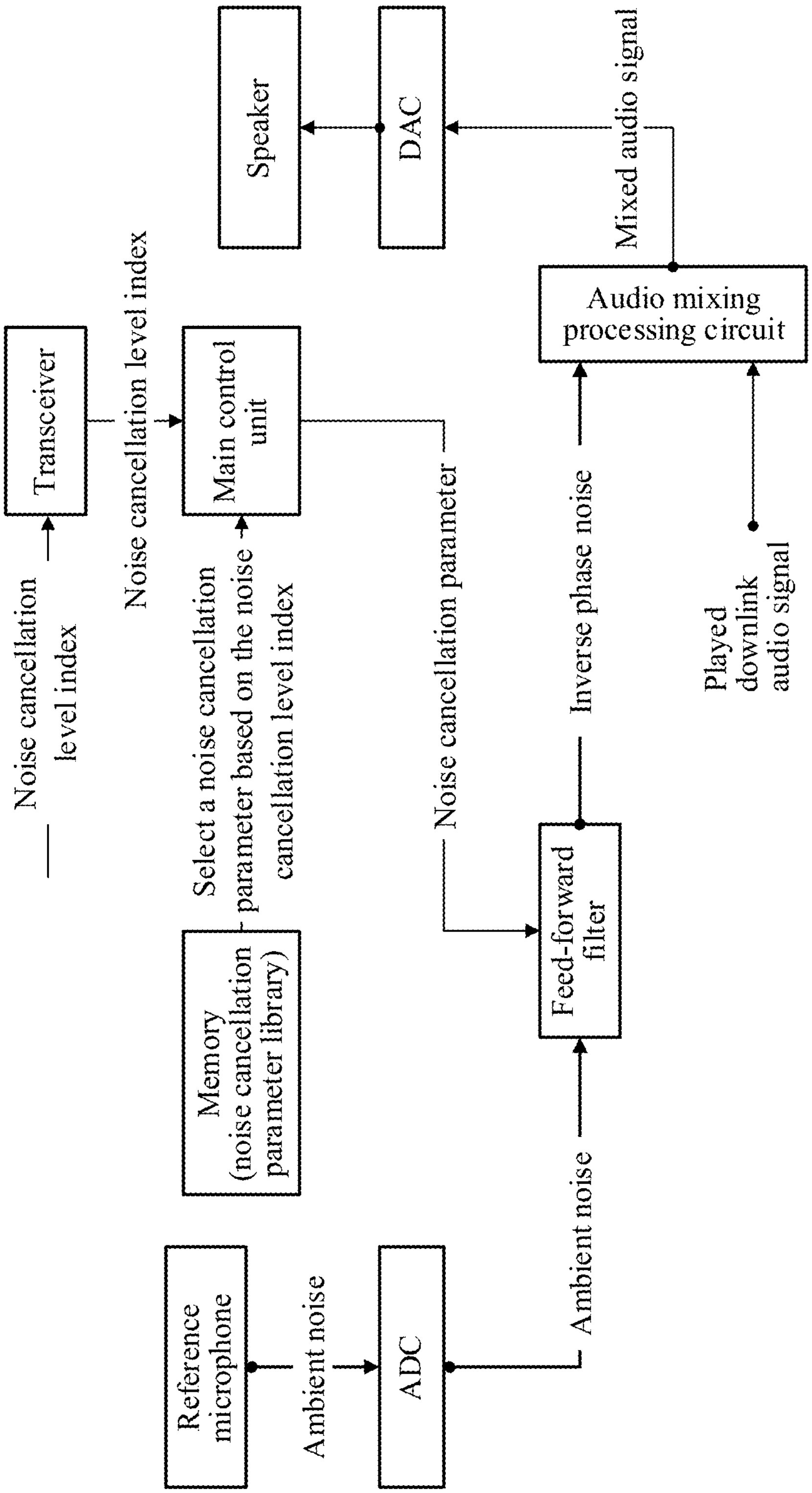
FIG. 5 is a signal flow direction diagram of an example noise cancellation method according to an embodiment of this application.

FIG. 5 is a signal flow direction diagram of a noise cancellation method according to an embodiment of this application. The noise cancellation method may be applied to the noise cancellation headset shown in FIG. 2.

The method includes the following steps.

S1: A transceiver receives a noise cancellation level index.

For example, the noise cancellation level index may be set by a user in a control interface of a noise cancellation application APP of a smartphone, and the noise cancellation level index may be transmitted to the transceiver of the headset through a Bluetooth link.

S2: A main control unit selects, from a noise cancellation parameter library based on the noise cancellation level index, a noise cancellation parameter corresponding to the noise cancellation level index.

The noise cancellation parameter library includes a plurality of groups of correspondences between noise cancellation level indexes and noise cancellation parameters, a value of the noise cancellation level index reflects a magnitude of a leakage degree, and the noise cancellation parameter corresponding to the noise cancellation level index matches the leakage degree corresponding to the noise cancellation level index. Optionally, the noise cancellation parameter library is obtained through statistics collection based on relationships between leakage degrees and noise cancellation parameters. In an optional case, a plurality of adjacent noise cancellation level indexes may correspond to a same noise cancellation parameter. For example, a noise cancellation level index in a first range corresponds to a first noise cancellation parameter, and a noise cancellation level index in a second range corresponds to a second noise cancellation parameter.

S3: The main control unit writes the noise cancellation parameter into a position of a feed-forward filtering coefficient in a noise cancellation processing circuit.

S4: The feed-forward filter performs, based on the noise cancellation parameter, filtering processing on an ambient noise collected by a reference microphone to obtain an inverse phase noise, where the inverse phase noise is an inverse phase noise of the ambient noise.

It should be understood that a signal processed by the feed-forward filter is an electrical signal, and the ambient noise collected by the reference microphone is an analog signal. Optionally, before the feed-forward filter filters the ambient noise, an ADC converts the analog signal of the ambient noise into an electrical signal.

S5: An audio mixing processing circuit performs audio mixing processing on a played downlink audio signal and the inverse phase noise to obtain a mixed audio signal.

The played downlink audio signal is an original audio signal that does not include a noise, and the mixed audio signal includes the inverse phase noise of the ambient noise.

S6: A DAC converts the mixed audio signal from an electrical signal to an analog signal.

S7: The analog signal of the mixed audio signal is played by using a speaker and enters an ear canal of the user.

Because the mixed audio signal includes the inverse phase noise of the ambient noise, when the mixed audio signal and the ambient noise enter the ear canal of the user together, the inverse phase noise can cancel the ambient noise. In addition, the noise cancellation index is set by the user based on a situation of the user, and the noise cancellation parameter corresponding to the noise cancellation index matches a degree to which the ambient noise leaks into the headset worn by the user. Therefore, an effect of canceling the ambient noise by using the inverse phase noise obtained based on the noise cancellation parameter is optimal for the user who wears the headset.

In an optional case, the headset shown in FIG. 2 further has a hear through (Hear Through, HT) function. Generally, when the user wears the headset, an external sound is attenuated when transmitted to the ear canal of the user by using the headset. The hear through function is used to compensate for an audio component attenuated by the headset, so that the user can still clearly hear the sound from an external environment even when wearing the headset. It should be understood that the transparently transmitted sound generally refers to a sound other than the noise or other useful audio signals, and the component compensated by using the hear through function is usually a high-frequency component in the sound.

In this case, the transceiver 250 is further configured to receive a target hear through level index, where the target hear through level index is set by the user in the APP and transmitted to the transceiver through the wireless link, and the target hear through level index is used to determine a target hear through level and a target hear through parameter corresponding to the target hear through level. The target hear through parameter is a hear through parameter that matches the leakage degree to which the ambient noise leaks into the ear canal, in other words, a compensation audio signal obtained after processing performed based on the target hear through parameter can compensate for, to the greatest extent, an audio signal attenuated by the headset. In an optional case, the user controls, by using the APP on the intelligent mobile terminal, enabling or disabling of the hear through function, and sets the target hear through level by using the APP, where the target hear through level is a hear through level suitable for the leakage degree of the ear canal of the user. For example, the user may select, by adjusting a hear through level adjustment module on the APP, a hear through level index suitable for the user, and transmit the hear through level index to the transceiver of the headset through the Bluetooth link, so that the headset obtains an optimal hear through effect. A value of the hear through level index is related to the leakage degree.

It should be understood that a sound collected by the reference microphone may include an external useful audio signal, or may include the ambient noise.

The main control unit 230 is further configured to select, from a hear through parameter library based on the target hear through level index, the target hear through parameter corresponding to the target hear through level. For example, the target hear through parameter is hear through a hear through filtering coefficient. The memory 260 further stores the hear through parameter library, where the hear through parameter library includes a correspondence between a hear through level index and a hear through parameter. The value of the hear through level index reflects a magnitude of the leakage degree. A smaller hear through level index indicates a smaller leakage degree and a smaller corresponding hear through strength. A larger hear through level index indicates a larger leakage degree and a larger corresponding hear through strength. In this embodiment of this application, the hear through parameter library is obtained by testing relationships between leakage degrees and hear through parameters when the large quantity of users wear the headset. A correspondence between a hear through level and a hear through parameter in the hear through parameter library is universal, and is valid for most users.

The main control unit 230 is further configured to write the hear through parameter into the position of the feed-forward filtering coefficient, to configure a filter.

Figure 6:
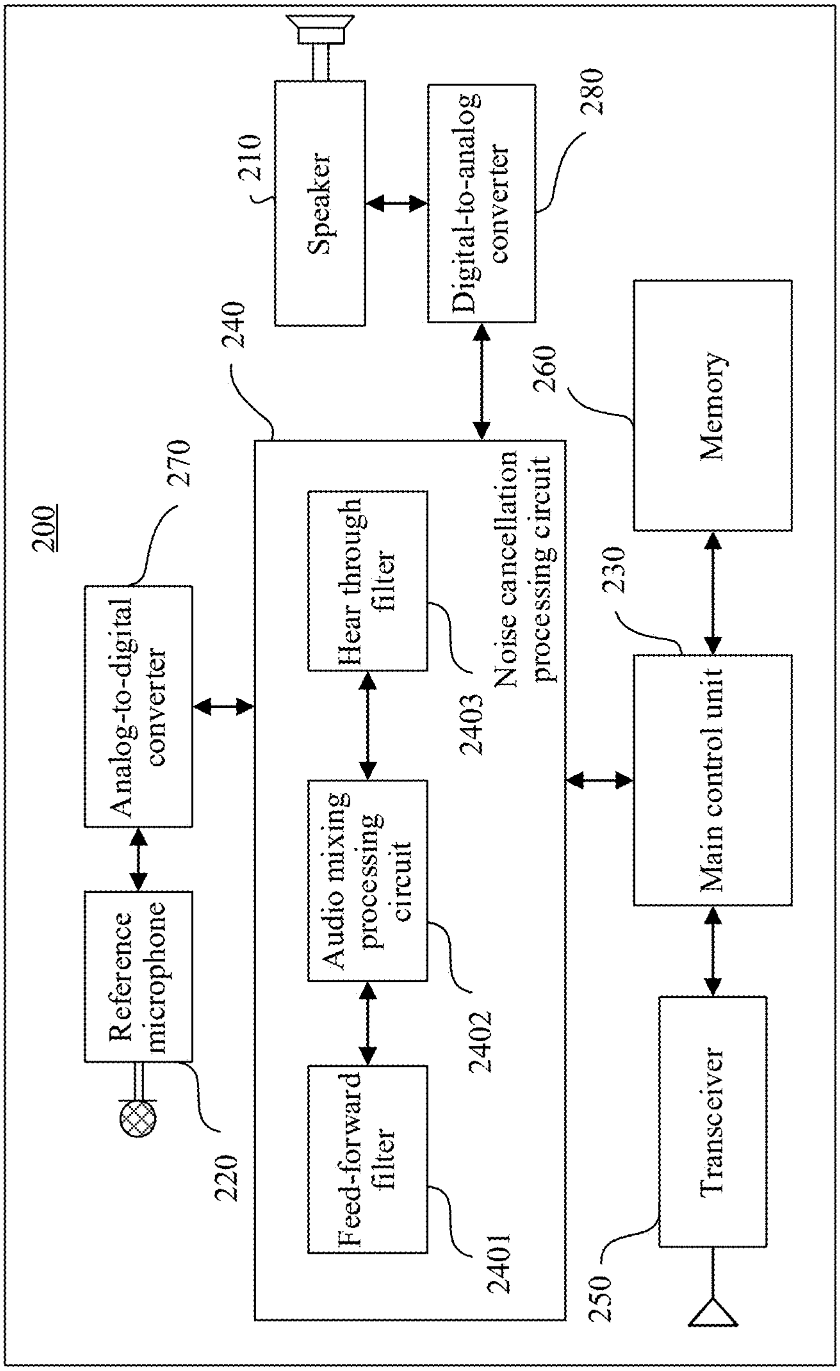
FIG. 6 is a schematic diagram of a structure of another example noise cancellation headset according to an embodiment of this application.

The feed-forward filter 2401 is further configured to perform, based on the hear through parameter, hear through processing on an external audio signal collected by the reference microphone to obtain a compensation audio signal of the external audio signal. The compensation audio signal is used to compensate for an audio signal attenuated by the headset in the external audio signal. Optionally, the audio signal attenuated by the headset is usually a high-frequency component in the audio signal. In an optional case, the headset further includes a hear through filter 2403. FIG. 6 is a schematic diagram of a structure of another example noise cancellation headset. A feed-forward filter 2401 performs noise cancellation processing on an ambient noise based on a noise cancellation parameter to obtain an inverse phase noise of the ambient noise. A hear through filter 2403 performs, based on the hear through parameter, hear through processing on an external useful audio signal to obtain a compensation audio signal.

An audio mixing processing circuit 2402 is further configured to perform audio mixing on a played downlink audio signal and the compensation audio signal to obtain a second mixed audio signal.

A speaker 210 is further configured to transmit the second mixed audio signal to an ear canal of a user.

When an external audio signal and the second mixed audio signal enter the ear canal of the user together, the compensation audio signal in the second mixed audio signal may compensate for an audio signal attenuated by the headset in the external audio signal, so that the user can still clearly hear an external sound when wearing the headset.

The headset shown in FIG. 6 in this embodiment of this application removes a noise signal based on the noise cancellation parameter, and compensates, based on the hear through parameter, for the useful audio signal attenuated by the headset. When the noise is removed, the external useful audio signal is retained. In this way, an audio signal transparently transmitted to the ear canal of the user is only a useful audio signal, excluding the noise.

Figure 7:
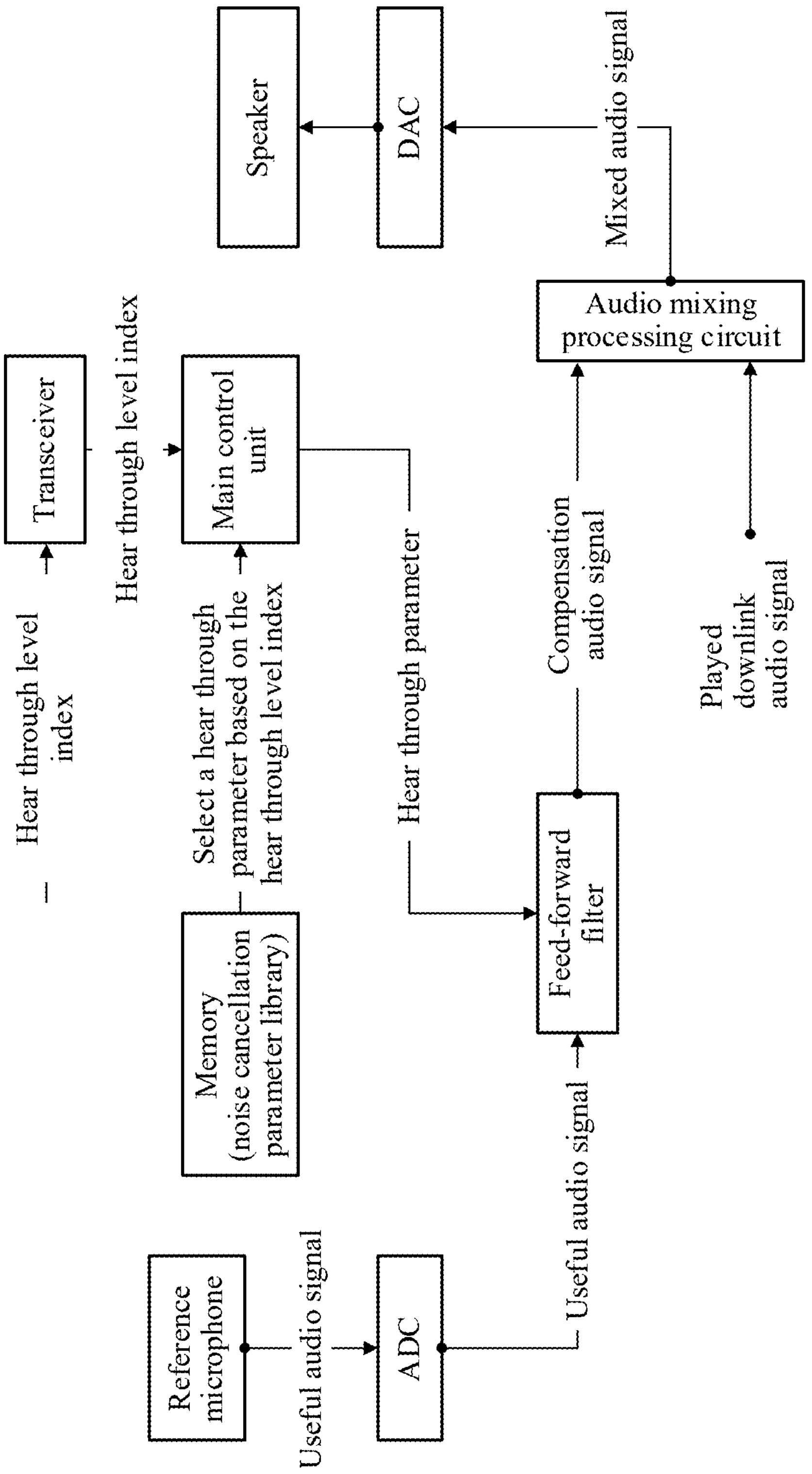
FIG. 7 is a signal flow direction diagram of an example hear through method according to an embodiment of this application.

FIG. 7 is a signal flow direction diagram of a hear through method according to an embodiment of this application. The hear through method may be applied to the headset shown in FIG. 2.

The method includes the following steps.

S1: A transceiver receives a hear through level index.

For example, the hear through level index may be set by a user in a control interface of an application APP of a smartphone, and transmitted to the transceiver of the headset through a Bluetooth link.

S2: A main control unit selects, from a hear through parameter library based on the hear through level index, a hear through parameter corresponding to the hear through level index.

The hear through parameter library includes a plurality of groups of correspondences between hear through level indexes and hear through parameters, a value of the hear through level index reflects a magnitude of a leakage degree, and the hear through parameter corresponding to the hear through level index matches the leakage degree corresponding to the hear through level index. Optionally, the hear through parameter library is obtained through statistics collection based on relationships between leakage degrees and hear through parameters.

S3: The main control unit writes the hear through parameter into a position of a feed-forward filtering coefficient.

S4: The feed-forward filter performs, based on the hear through parameter, hear through processing on a useful audio signal collected by a reference microphone to obtain a compensation audio signal, where the compensation audio signal is used to compensate for the useful audio signal attenuated by the headset.

It should be understood that a signal processed by the feed-forward filter is an electrical signal, and the useful audio signal collected by the reference microphone is an analog signal. Optionally, before the feed-forward filter filters the useful audio signal, an ADC converts the analog signal of the useful audio signal into an electrical signal.

S5: An audio mixing processing circuit performs audio mixing processing on a played downlink audio signal and the compensation audio signal to obtain a second mixed audio signal.

The played downlink audio signal is an original audio signal that does not include a noise, and the mixed audio signal includes the compensation audio signal of the useful audio signal.

S6: A DAC converts the second mixed audio signal from an electrical signal to an analog signal.

S7: The analog signal of the mixed audio signal is played by using a speaker and enters an ear canal of the user.

When an external audio signal and the second mixed audio signal enter the ear canal of the user together, the compensation audio signal in the second mixed audio signal may compensate for an audio signal attenuated by the headset in the external audio signal, so that the user can still clearly hear an external sound when wearing the headset. In addition, the hear through index is set by the user based on a situation of the user, and the hear through parameter corresponding to the hear through index matches a degree to which an ambient noise leaks into the headset worn by the user. Therefore, an effect of compensating for the audio signal attenuated by the headset by using the compensation audio signal obtained based on the hear through parameter is optimal for the user who wears the headset.

Figure 8:
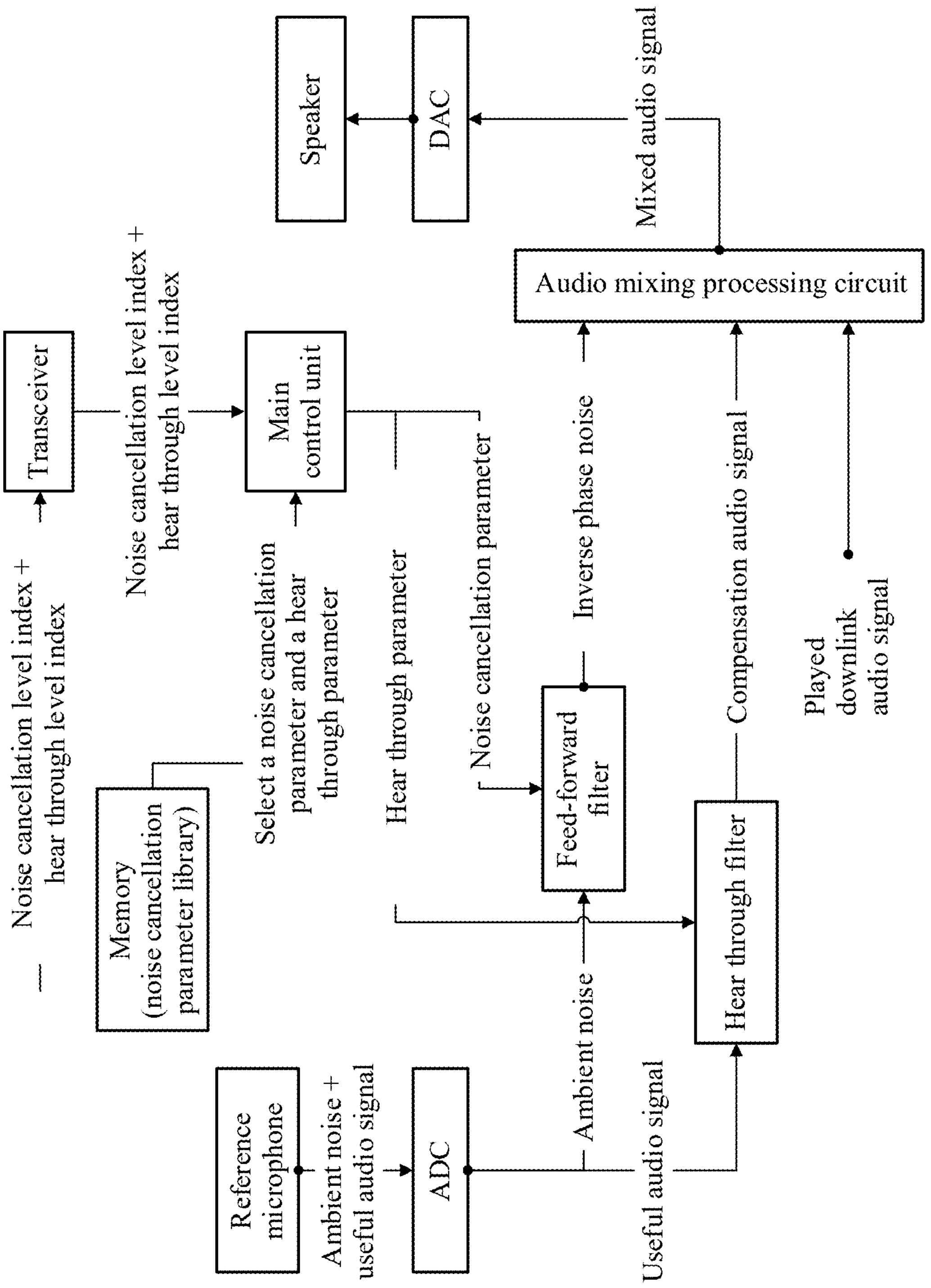
FIG. 8 is a signal flow direction diagram of an example noise cancellation and hear through method according to an embodiment of this application.

FIG. 8 is a signal flow direction diagram of a noise cancellation and hear through method according to an embodiment of this application. The method may be applied to the headset shown in FIG. 6.

The method includes the following steps.

S1: A transceiver receives a noise cancellation level index and a hear through level index.

For example, the noise cancellation level index and the hear through level index may be set by a user in a control interface of an application APP of a smartphone, and transmitted to the transceiver of the headset through a Bluetooth link.

S2: A main control unit selects, from a noise cancellation parameter library based on the noise cancellation level index, a noise cancellation parameter corresponding to the noise cancellation level index, and selects, from a hear through parameter library based on the hear through level index, a hear through parameter corresponding to the hear through level index.

S3: The main control unit writes the noise cancellation parameter into a position of a feed-forward filtering coefficient in a noise cancellation processing circuit, and writes the hear through parameter into a position of a hear through filtering coefficient.

S4: The feed-forward filter performs, based on the noise cancellation parameter, filtering processing on an ambient noise collected by a reference microphone to obtain an inverse phase noise, where the inverse phase noise is an inverse phase noise of the ambient noise.

S5: The hear through filter performs, based on the hear through parameter, hear through processing on a useful audio signal collected by the reference microphone to obtain a compensation audio signal, where the compensation audio signal is used to compensate for the useful audio signal attenuated by the headset.

Optionally, the method further includes S6: An ADC converts the ambient noise and the useful audio signal into electrical signals from analog signals.

S7: An audio mixing processing circuit performs audio mixing processing on a played downlink audio signal, the inverse phase noise, and the compensation audio signal to obtain a mixed audio signal.

The played downlink audio signal is an original audio signal that does not include a noise, and the mixed audio signal includes the inverse phase noise of the ambient noise and the compensation audio signal of the useful audio signal.

S8: A DAC converts the mixed audio signal from an electrical signal to an analog signal.

S9: The analog signal of the mixed audio signal is played by using a speaker and enters an ear canal of the user.

The mixed audio signal includes the inverse phase noise used to cancel the ambient noise and the compensation audio signal used to compensate for the useful audio signal attenuated by the headset. In this embodiment of this application, a noise signal is removed based on the noise cancellation parameter, and the useful audio signal attenuated by the headset is compensated based on the hear through parameter. When the noise is removed, an external useful audio signal is retained. An audio signal transparently transmitted to the ear canal of the user is only a useful audio signal, excluding the noise. In this way, a noise cancellation function and a hear through function are provided.

Figure 9:
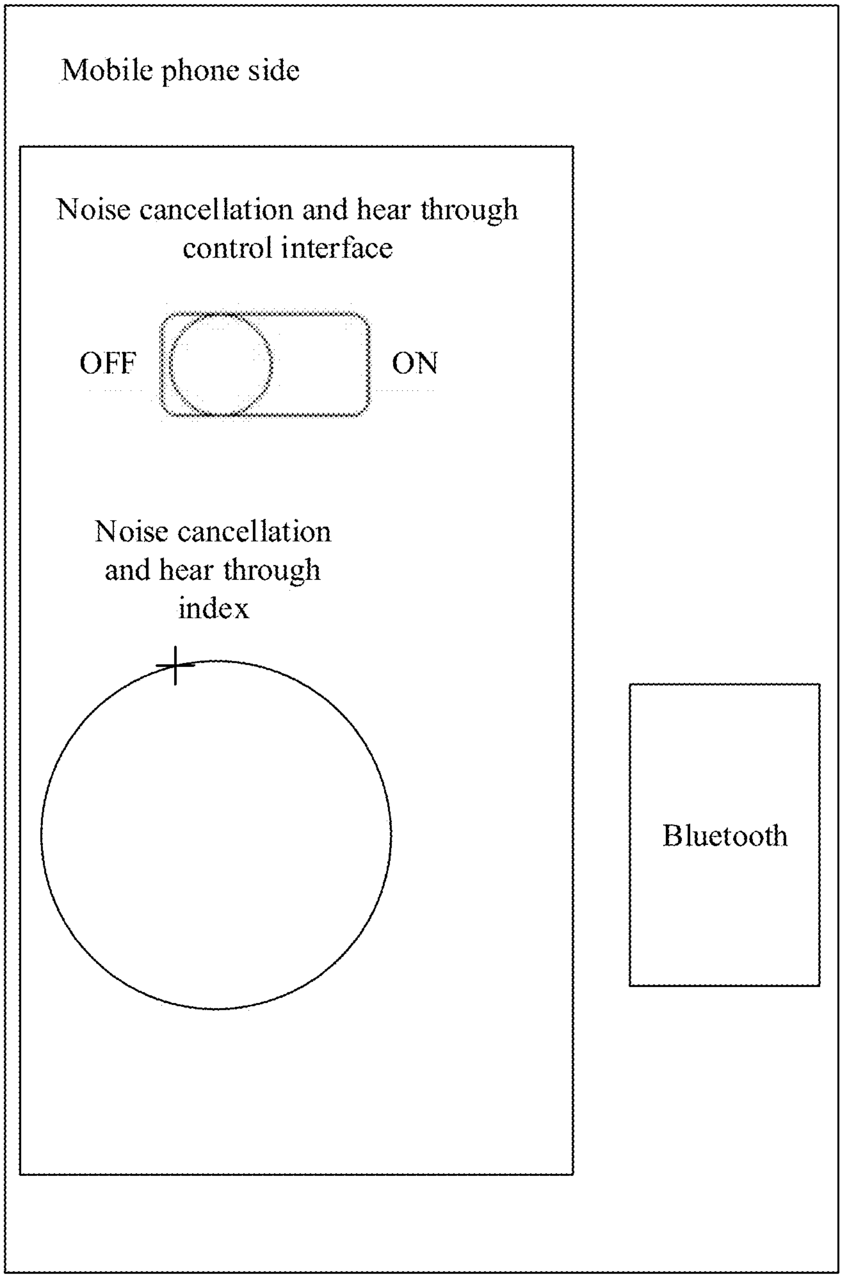
FIG. 9 is an example control interface of an application according to an embodiment of this application.

FIG. 9 is an example control interface of an application according to an embodiment of this application.

The control interface includes a switch control module and a level adjustment circular disk, and the control interface performs unified control on a noise cancellation function and a hear through function. The switch control module is configured to control enabling or disabling of the noise cancellation function and the hear through function. The switch control module includes two gears "OFF" and "ON". Optionally, an identifier of the gear may alternatively be written in Chinese. For example, two gears "关闭" and "打开" are included. When the switch control module is set to "OFF" or "关闭", the active noise cancellation function and the hear through function of the headset are disabled at the same time. When the switch control module is set to "ON" or "打开", the active noise cancellation function and the hear through function of the headset are enabled at the same time. The level adjustment circular disk includes one indication button. The indication button is used to identify a set noise cancellation level index and a set hear through level index. A user may set the noise cancellation level index and the hear through level index by rotating a position of the indication button. For a feature and a function of the level adjustment circular disk, refer to descriptions in the embodiment corresponding to FIG. 3. Details are not described herein again.

Figure 10:
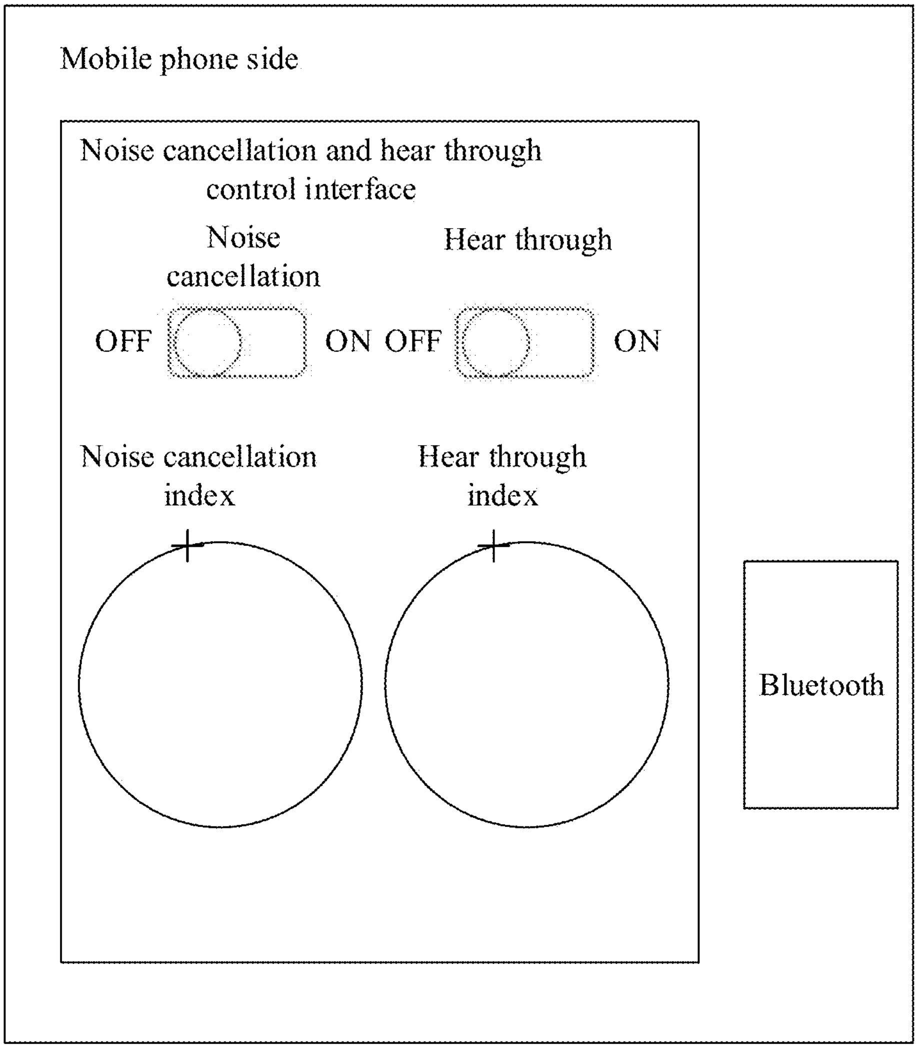
FIG. 10 is another example control interface of an application according to an embodiment of this application.

FIG. 10 is another example control interface of an application according to an embodiment of this application. The control interface includes a noise cancellation function switch control module, a hear through function switch control module, a noise cancellation level adjustment circular disk, and a hear through level adjustment circular disk, and the control interface separately controls a noise cancellation function and a hear through function. For a feature and a function of the level adjustment circular disk, refer to descriptions in the embodiment corresponding to FIG. 3. Details are not described herein again.

Optionally, the level adjustment modules in FIG. 9 and FIG. 10 each may alternatively be implemented by using a bar graph. This is not limited in the embodiments of this application.

Figure 11:
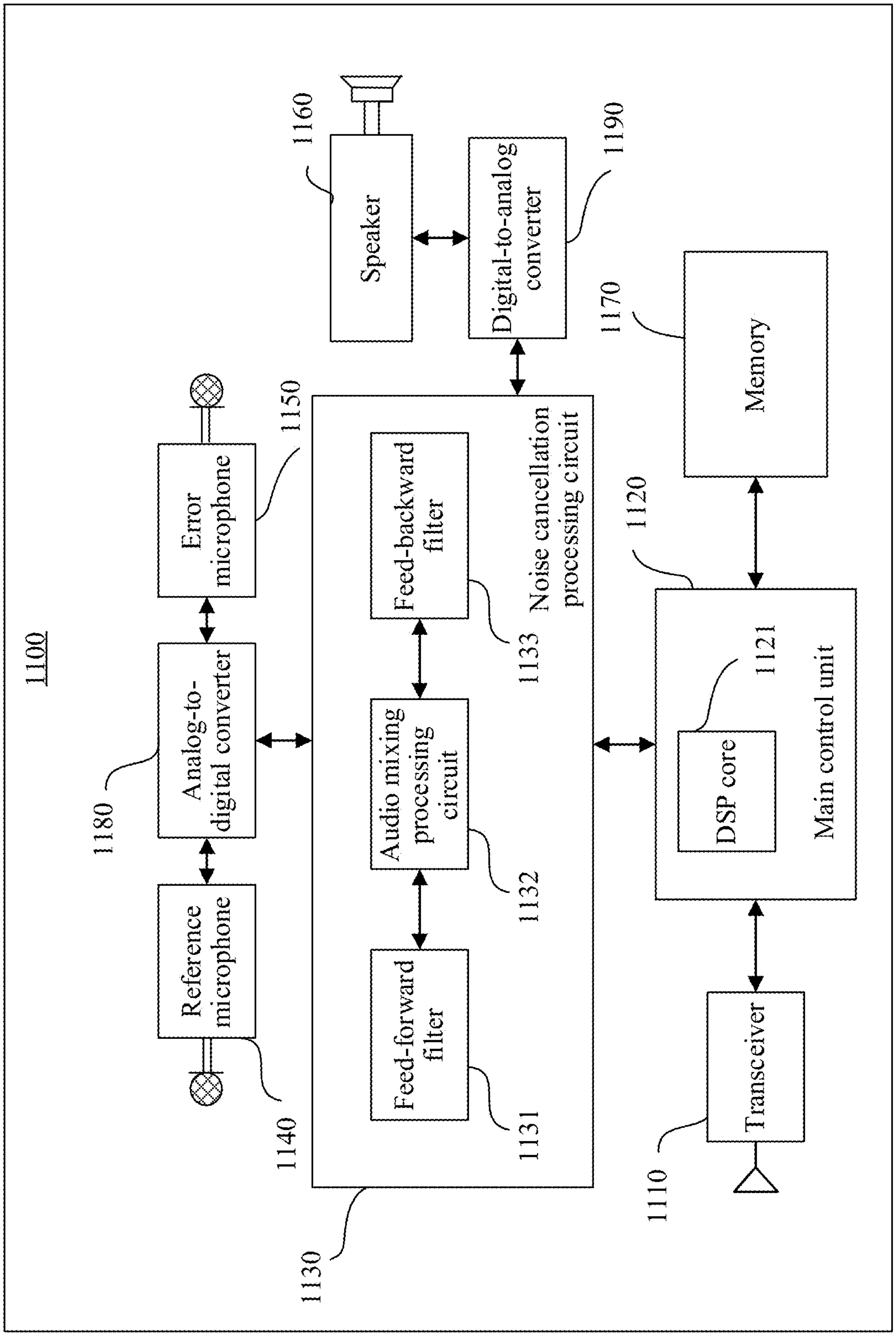
FIG. 11 is a schematic diagram of a structure of another example noise cancellation headset according to an embodiment of this application.

FIG. 11 is a schematic diagram of a structure of an example noise cancellation headset 1100 according to an embodiment of this application.

The headset 1100 includes a transceiver 1110, a main control unit 1120, a noise cancellation processing circuit 1130, a reference microphone 1140, an error microphone 1150, and a speaker 1160. Optionally, the headset 1100 further includes a memory 1170, an ADC 1180, and a DAC 1190. The noise cancellation processing circuit 1130 includes a feed-forward filter 1131, a feed-backward (FB) filter 1133, and an audio mixing processing circuit 1132. In an optional case, the foregoing parts of the headset 1100 are coupled by using connectors. It should be understood that, in the embodiments of this application, coupling refers to mutual connection in a specified manner, including indirect connection by using another device or direct connection. For example, the parts may be connected through various interfaces, transmission lines, buses, or the like. These interfaces are usually electrical communication interfaces, but it is not excluded that the interfaces may be mechanical interfaces or interfaces in another form. This is not limited in this embodiment.

The main control unit 1120 is configured to determine a target noise cancellation level index based on a matching degree feature value, where the matching degree feature value is used to indicate a matching degree between the headset and an ear canal of a user. Different matching degrees cause different degrees to which an ambient noise leaks into the ear canal of the headset wearer.

For example, the matching degree feature value is a ratio of a primary path (PP) transfer function to a secondary path (SP) transfer function, where the PP is a transfer function from the reference microphone to the error microphone, and the SP is a transfer function from the speaker to the error microphone. An input of the PP is the ambient noise obtained by the reference microphone, and an output is an audio signal obtained by the error microphone. An input of the SP is a mixed audio signal sent to the speaker, and an output is the audio signal obtained by the error microphone.

In this case, the PP/SP is used to indicate a leakage degree of the headset (or may also be referred to as the matching degree between the headset and the ear canal), and the matching degree may be reflected by a value of the noise cancellation level index value. Optionally, when the PP/SP meets a preset condition, a noise cancellation level index value corresponding to the preset condition is selected. For example, when $L0 \le PP/SP < L1$, it is determined that the noise cancellation level index value is 1. When $L1 \le PP/$ SP<L2, it is determined that the noise cancellation level index value is 2. The rest may be deduced by analogy.

For a semi-open headset, it is found by using an experiment that amplitude-frequency responses of PPs and SPs corresponding to different human ears fluctuate in a range of 1 kHz to 3 kHz, and there is no obvious rule. If the matching degree is determined based on an amplitude-frequency response of a PP or an SP, and a noise cancellation strength is adjusted accordingly. This is not completely applicable to different users. In this embodiment of this application, it is found that amplitude-frequency responses of PP/SP (the ratio of the PP to the SP) corresponding to the different human ears have a relatively clear change rule in the range of 1 kHz to 3 kHz. Therefore, in this embodiment of this application, PP/SP is used as a feature value for recognizing the matching degree.

For example, the matching degree feature value is obtained by the MCU 1120. Specifically, the MCU 1120 sends a test signal to the speaker 1160, to indicate the speaker to send the mixed audio signal received by the speaker to the MCU. The MCU 1120 obtains an audio signal obtained by the reference microphone 1140, the audio signal obtained by the error microphone 1150, and the mixed audio signal sent to the speaker 1160. In an optional solution, after sampling rate conversion (SRC) processing is performed on the audio signal obtained by the reference microphone 1140, the audio signal obtained by the error microphone 1150, and the mixed audio signal sent to the speaker 1160, processed audio signals are sent to the MCU 1120. The SRC processing is used to reduce sampling rates of the audio signals. After the sampling rates of the audio signals are reduced, computing resources, interface bandwidth, storage space, and the like of the MCU are reduced. Optionally, the MCU 1120 includes a digital signal processor core (DSP Core) 1121, and the DSP core 1121 obtains the SP based on the mixed audio signal sent to the speaker 1160 and the audio signal obtained by the error microphone 1150. The DSP core 1121 obtains the PP based on the audio signal obtained by the reference microphone 1140 and the audio signal obtained by the error microphone 1150. Further, the DSP core 1121 obtains the matching degree feature value PP/SP based on the PP and the SP. It should be understood that the DSP core may alternatively be independent of the MCU. This is not limited in this embodiment of this application.

In an optional solution, the matching degree feature value may alternatively be obtained by the noise cancellation processing circuit 1130. For example, the noise cancellation processing circuit is an active noise cancellation processor core ANC core. In this case, the ANC core obtains the SP, the PP, and the PP/SP.

In an optional solution, a factor L(i) is first set based on different noise cancellation level index values i, the PP is compared with L(i)×SP, and a value i that enables the PP to be closest to L(i)×SP is the target noise cancellation level index. For example, N groups of noise cancellation level index value factors L(1) to L(N) are preset; the PP is compared with L(i)×SP, where $1 \le i \le N$; and when the PP is closest to L(j)×SP, j is determined as the target noise cancellation level index.

The main control unit 1120 is further configured to select, from a noise cancellation parameter library based on the target noise cancellation level index, a target noise cancellation parameter corresponding to the target noise cancellation level index, where the target noise cancellation parameter corresponding to the target noise cancellation level index matches the leakage degree.

In an optional solution, the main control unit 1120 may determine the target noise cancellation parameter based on the matching degree feature value. For example, the main control unit 1120 selects, from the noise cancellation parameter library based on the matching degree feature value, a noise cancellation parameter corresponding to the matching degree feature value as the target noise cancellation parameter, where the noise cancellation parameter library includes a correspondence between a matching degree feature value and a noise cancellation parameter. The noise cancellation parameter library is obtained based on statistical results of relationships between the matching degree feature value and noise cancellation parameters.

For example, the target noise cancellation parameter includes an FF filtering coefficient and an FB filtering coefficient. For example, the noise cancellation parameter library is stored in the memory 1170. The memory 1170 may be a memory outside the MCU, or may be a storage unit inside the MCU. The memory is a non-power-off volatile memory. The noise cancellation parameter library includes a plurality of groups of noise cancellation level indexes and noise cancellation parameters that are in a one-to-one correspondence. In an optional case, a plurality of adjacent noise cancellation level indexes may correspond to a same noise cancellation parameter. For example, a noise cancellation level index in a first range corresponds to a first noise cancellation parameter, and a noise cancellation level index in a second range corresponds to a second noise cancellation parameter. The noise cancellation parameter library is alternatively obtained through statistics collection based on relationships between leakage degrees and noise cancellation parameters.

The main control unit 1120 is further configured to write the noise cancellation parameter into a position of a filtering coefficient corresponding to the noise cancellation processing circuit 1130, to configure a filter.

The main control unit 1120 is specifically configured to write the FF filtering coefficient into a position of a feed-forward filtering coefficient in the noise cancellation processing circuit, and write the FB filtering coefficient into a position of a feed-backward filtering coefficient in the noise cancellation processing circuit, to configure the FF filter and the FB filter.

The noise cancellation processing circuit 1130 is configured to obtain a target inverse phase noise based on the target noise cancellation parameter, where the target inverse phase noise may be used to cancel the external ambient noise.

Specifically, the FF filter 1131 performs, based on the FF filtering coefficient, filtering processing on the ambient noise obtained by the reference microphone 1140 to obtain a first inverse phase noise. The FB filter 1133 performs filtering processing on a noise signal of the error microphone based on the FB filtering coefficient to obtain a second inverse phase noise. The first inverse phase noise and the second inverse phase noise are superimposed to obtain the target inverse phase noise.

The noise signal of the error microphone is an audio signal obtained after a played downlink audio signal is removed from the audio signal obtained by the error microphone 1150. Specifically, audio mixing is performed on a played downlink audio signal obtained after compensation filtering is performed on the played downlink audio signal and the audio signal obtained by the error microphone 1150 to obtain the noise signal of the error microphone. It should be understood that compensation filtering is performed on the played downlink audio signal to prevent the FB filter from canceling the played downlink audio signal.

The audio mixing processing circuit 1132 is configured to perform audio mixing processing on the played downlink audio signal and the target inverse phase noise to obtain a mixed audio signal.

The ADC 1180 is configured to convert the ambient noise obtained by the reference microphone 1140 and the audio signal obtained by the error microphone 1150 into electrical signals from analog signals, where the mixed audio signal obtained after processing performed by the noise cancellation processing circuit is an electrical signal. The DAC 1190 is configured to convert the mixed audio signal into an analog mixed audio signal from the electrical signal, and the speaker 1160 is specifically configured to play the analog mixed audio signal to the ear canal of the user.

According to the noise cancellation headset provided in this embodiment of this application, the matching degree between the headset and the ear canal of the user is adaptively determined by measuring the matching degree feature value, the degree of noise leakage caused by the headset is determined, and the noise cancellation level index and the target noise cancellation parameter are determined based on the matching degree. The target noise cancellation parameter is adaptive to the matching degree, and the noise cancellation processing circuit performs noise cancellation processing based on the noise cancellation parameter, so that the headset can obtain an optimal noise cancellation effect. The noise cancellation headset may determine matching degrees of different users, and adaptively select noise cancellation parameters adaptive to the different users, so that a noise cancellation effect is better and an adaptation degree is higher. In addition, the user does not need to set a noise cancellation level and a noise cancellation parameter, thereby improving user experience. In addition, because the PP/SP is selected as the feature value for determining the matching degree in this embodiment of this application, determining the matching degree based on the feature value is more accurate. Therefore, the determined noise cancellation strength and the determined noise cancellation parameter are also more accurate, and the optimal noise cancellation effect can be provided for the different users.

Figure 12:
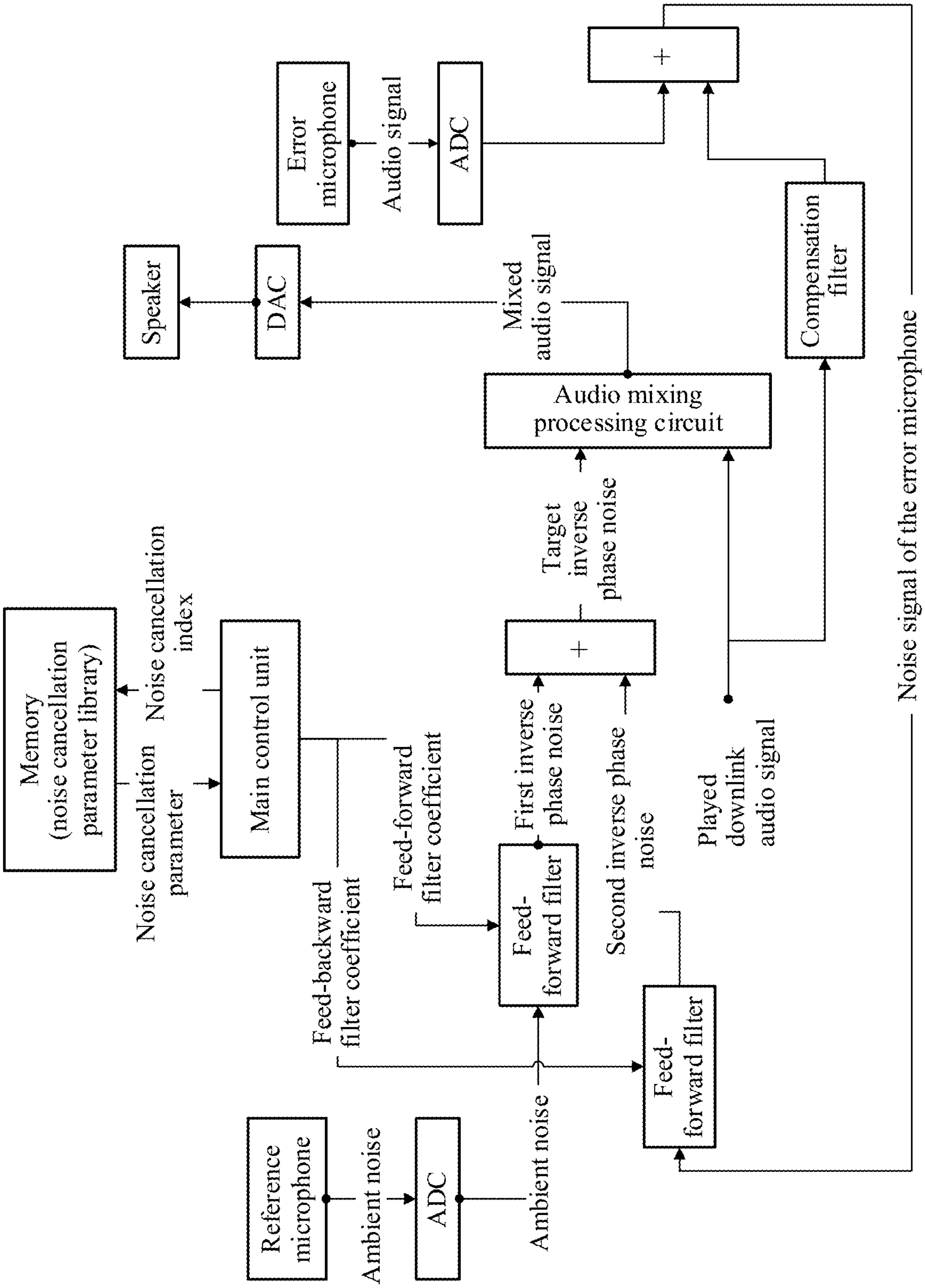
FIG. 12 is a signal flow direction diagram of an example noise cancellation method according to an embodiment of this application.

FIG. 12 is a signal flow direction diagram of a noise cancellation method according to an embodiment of this application. The noise cancellation method may be applied to the noise cancellation headset shown in FIG. 11.

The method includes the following steps.

S1201: A main control unit determines a matching degree feature value, and determines a target noise cancellation level index based on the matching degree feature value.

It should be understood that the matching degree feature value is used to indicate a leakage degree, and step S1201 may alternatively be completed by the noise cancellation processing circuit 1130. For the matching degree feature value, refer to the descriptions in the embodiment corresponding to FIG. 11. Details are not described herein again.

For example, the determining a target noise cancellation level index based on the matching degree feature value specifically includes:

When PP/SP meets a preset condition, an index value corresponding to the preset condition is determined as the target noise cancellation level index. For example, when $L0 \leq PP/SP < L1$, it is determined that the noise cancellation level index value is 1. When $L1 \leq PP/SP < L2$, it is determined that the noise cancellation level index value is 2. The rest may be deduced by analogy.

In an optional solution, a factor L(i) is first set based on different noise cancellation level index values i, the PP is compared with L(i)×SP, and a value i that enable the PP to be closest to L(i)×SP is the target noise cancellation level index. For example, N groups of noise cancellation level index value factors L(1) to L(N) are preset; the PP is compared with L(i)×SP, where $1 \leq i \leq N$; and when the PP is closest to L(j)×SP, j is determined as the target noise cancellation level index.

S1202: The main control unit selects, from a noise cancellation parameter library based on the target noise cancellation level index, a target noise cancellation parameter corresponding to the target noise cancellation level index, where the target noise cancellation parameter corresponding to the target noise cancellation level index matches the leakage degree. For example, the noise cancellation parameter library is stored in a memory. The target noise cancellation parameter includes a feed-forward filtering coefficient and a feed-backward filtering coefficient.

In an optional case, S1201 and S1202 may be replaced as follows: The main control unit selects, from the noise cancellation parameter library based on the matching degree feature, a noise cancellation parameter corresponding to the matching degree feature value as the target noise cancellation parameter. The noise cancellation parameter library includes a correspondence between a matching degree feature value and a noise cancellation parameter. The noise cancellation parameter library is obtained based on statistical results of relationships between the matching degree feature value and noise cancellation parameters.

S1203: A reference microphone obtains an ambient noise, an error microphone obtains an audio signal, and the audio signal obtained by the error microphone is approximately considered as an audio signal heard by a human ear. Audio mixing processing is performed on a played downlink audio signal obtained after compensation filtering is performed on the played downlink audio signal and the audio signal obtained by the error microphone to obtain a noise signal of the error microphone.

S1204: The main control unit writes the FF filtering coefficient into a position of the feed-forward filtering coefficient in the noise cancellation processing circuit, and writes the FB filtering coefficient into a position of the feed-backward filtering coefficient in the noise cancellation processing circuit, to configure the FF filter and the FB filter.

S1205: The FF filter performs, based on the FF filtering coefficient, filtering processing on the ambient noise obtained by the reference microphone to obtain a first inverse phase noise. The FB filter performs filtering processing on the noise signal of the error microphone based on the FB filtering coefficient to obtain a second inverse phase noise. The first inverse phase noise and the second inverse phase noise are superimposed to obtain a target inverse phase noise.

S1206: An audio mixing processing circuit performs audio mixing processing on the played downlink audio signal and the target inverse phase noise to obtain a mixed audio signal.

S1207: A DAC converts the mixed audio signal into an analog mixed audio signal from an electrical signal, where the analog mixed audio signal is played to an ear canal of a user by using a speaker.

According to the noise cancellation method provided in this embodiment of this application, the headset autonomously measures the matching degree feature value, to adaptively determine a matching degree between the headset and the ear canal of the user, and determines the noise cancellation level index and the target noise cancellation parameter based on the matching degree. This method can adaptively select noise cancellation parameters adaptive to different users. In this way, a noise cancellation effect is better and an adaptation degree is higher. In addition, because the PP/SP is selected as a feature value for determining the matching degree in this embodiment of this application, determining the matching degree based on the feature value is more accurate. Therefore, a determined noise cancellation strength and the determined noise cancellation parameter are also more accurate, and an optimal noise cancellation effect can be provided for the different users.

It should be understood that, for ease of understanding, the method embodiments are described in the embodiments of this application in a form of steps. However, in some cases, the described steps may be performed in a sequence different from that described herein. In addition, it should be understood that the noise cancellation method for implementing noise cancellation by the noise cancellation processing circuit in the headset shown in FIG. 11 may be any method in the conventional technology for implementing noise cancellation by processing an audio signal obtained by the reference microphone and the audio signal obtained by the error microphone.

In an optional case, the headset shown in FIG. 11 may further implement a hear through function, or the headset shown in FIG. 11 may implement both a noise cancellation function and the hear through function. A parameter for performing hear through processing by the headset shown in FIG. 11 is autonomously determined by the headset based on the matching degree feature value, and does not need to be set by the user. For implementation of other parts, refer to descriptions in the embodiments in which the headset in FIG. 2 and FIG. 6 implements the hear through function. Details are not described herein again.

An embodiment of this application further provides an active noise cancellation headset. The active noise cancellation headset includes a reference microphone, a main control unit MCU, a noise cancellation processing circuit, and a speaker. The active noise cancellation headset may automatically control enabling or disabling of a noise cancellation function, adjustment of a noise cancellation level of the headset, and the like based on a magnitude of an ambient noise obtained by the reference microphone or feature information of an ambient noise. For example, the active noise cancellation headset may be the headset shown in FIG. 2, FIG. 6, and FIG. 11.

The reference microphone is configured to obtain the external ambient noise.

The MCU is configured to: compare the ambient noise with a plurality of groups of preset noise ranges; and determine a noise range to which the ambient noise belongs, to determine a corresponding noise cancellation level and a corresponding noise cancellation parameter. The plurality of groups of preset noise ranges and the noise cancellation level and the noise cancellation parameter corresponding to the preset noise range may be stored in a non-power-off volatile memory of the headset.

For example, in an automatic control mode, when the ambient noise is lower than a noise cancellation function enabling threshold Threshold_low, the noise cancellation function is disabled.

When the ambient noise is in a range of [Threshold_low, Threshold_middle], the noise cancellation level of the headset is set to a weak noise cancellation level.

When the ambient noise is in a range of [Threshold_middle, Threshold_high], the noise cancellation level of the headset is set to a normal noise cancellation level.

When the ambient noise is greater than Threshold_high, the noise cancellation level of the headset is set to a deep noise cancellation level.

The weak noise cancellation level corresponds to a weak noise cancellation parameter, the normal noise cancellation level corresponds to a normal noise cancellation parameter, and the deep noise cancellation level corresponds to a deep noise cancellation parameter.

The noise cancellation processing circuit performs noise cancellation processing on the ambient noise based on the noise cancellation parameter corresponding to the set noise cancellation level.

Figure 13:
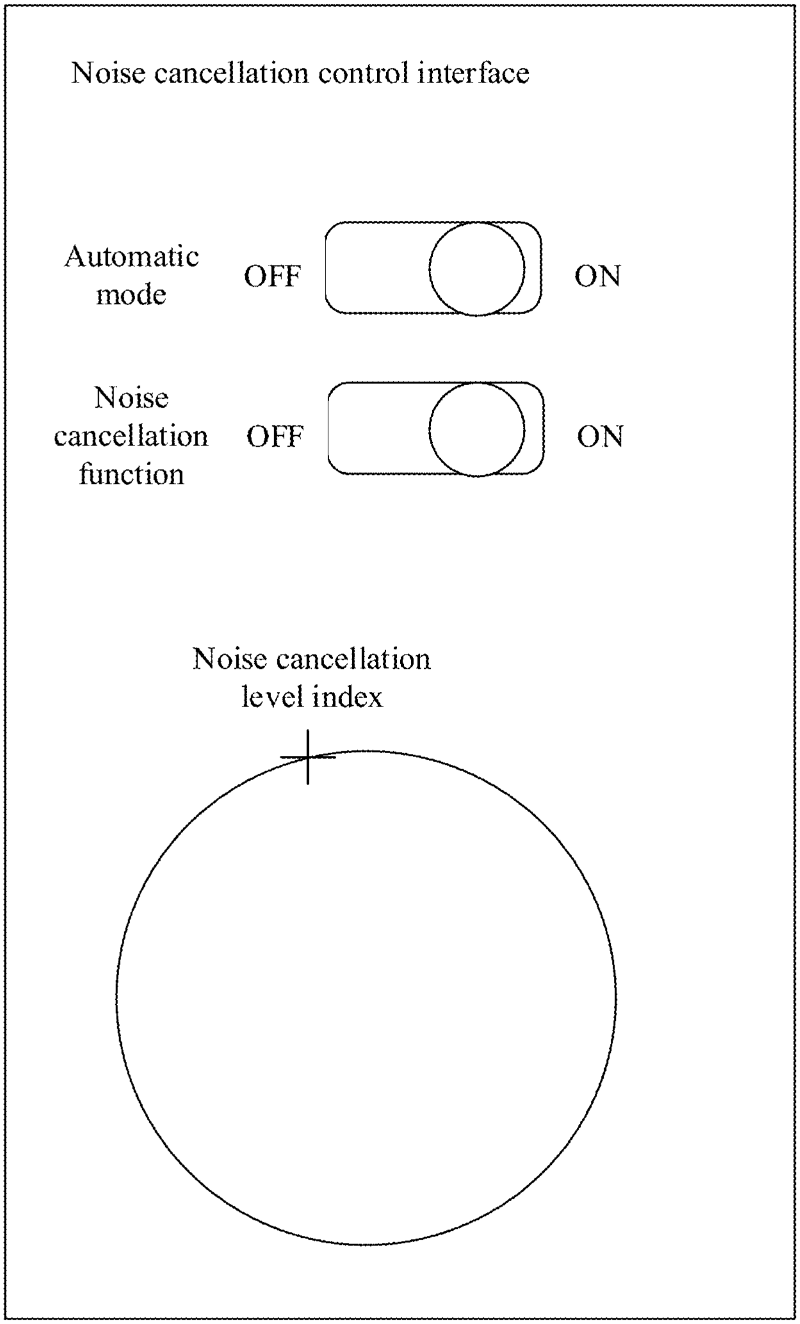
FIG. 13 is a schematic diagram of an example control interface of an APP according to an embodiment of this application.

FIG. 13 is a schematic diagram of an example control interface of an APP according to an embodiment of this application. The control interface includes an automatic mode switch control module. A user may control, in the control interface, whether to enable an automatic control mode based on perception on an ambient noise. When the automatic control mode is enabled, a headset automatically controls enabling or disabling of an active noise cancellation function and a setting of a noise cancellation level based on a magnitude of the ambient noise. In this case, a setting of the user no longer takes effect. Specifically, when the automatic control mode is enabled, a noise cancellation level index set by the user by dragging a noise cancellation level adjustment disk or adjustment bar does not take effect.

In an optional case, an MCU may alternatively detect feature information of the ambient noise obtained by a reference microphone, and automatically control enabling or disabling of the active noise cancellation function and the setting of the noise cancellation level based on the feature information. For example, a memory stores a plurality of groups of correspondences between preset noise feature information, noise cancellation levels, and noise cancellation parameters. The MCU automatically determines, by comparing the feature information of the ambient noise with the preset noise feature information, a noise cancellation level and a noise cancellation parameter that match the ambient noise.

For example, the preset noise feature information includes a noise feature in a quiet environment, a noise feature of an airplane in flight, a noise feature of a running subway, a noise feature in a street environment, and the like.

When the feature information of the ambient noise meets the noise feature in the quiet environment, the active noise cancellation function is disabled.

When the feature information of the ambient noise meets the noise feature of the airplane in flight, the noise cancellation level of the headset is set to an airplane mode noise cancellation level.

When the feature information of the ambient noise meets the noise feature of the running subway, the noise cancellation level of the headset is set to a subway mode noise cancellation level.

When the feature information of the ambient noise meets the noise feature in the street environment, the noise cancellation level of the headset is set to a street mode noise cancellation level.

Other environments are deduced by analogy, and are not enumerated in this embodiment of this application.

In an optional case, the user may alternatively control, in the control interface of the APP, whether to enable the automatic control mode based on perception on the ambient noise. When the automatic control mode is enabled, the headset automatically controls, based on the feature information of the ambient noise, enabling or disabling of the active noise cancellation function and the setting of the noise cancellation level. In this case, the noise cancellation level index set by the user by dragging the noise cancellation level adjustment disk or adjustment bar does not take effect.

Figure 14:
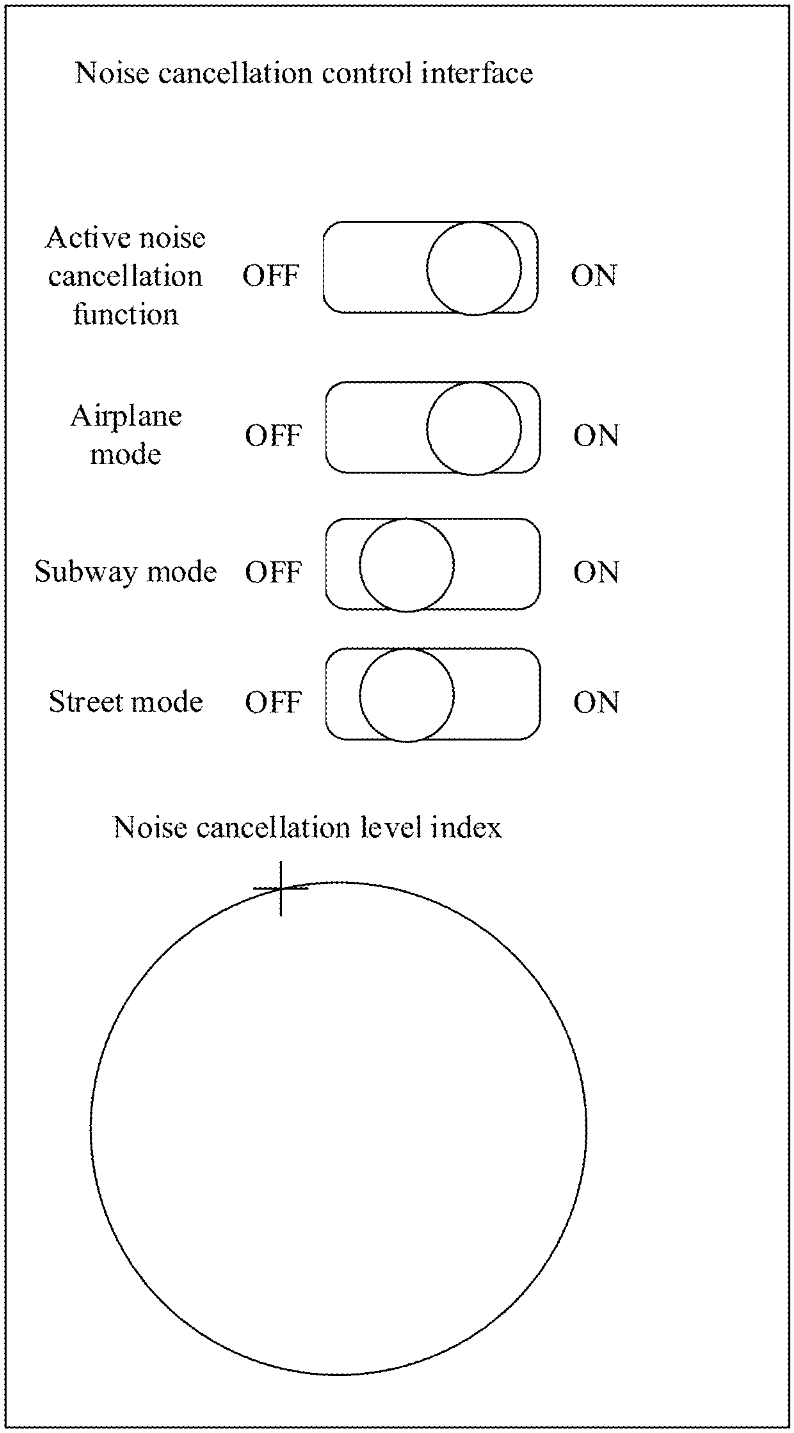
FIG. 14 is a schematic diagram of another example control interface of an APP according to an embodiment of this application.

FIG. 14 is a schematic diagram of another control interface according to an embodiment of this application. The control interface includes an active noise cancellation function switch module, an airplane mode switch module, a subway mode switch module, a street mode switch module, and a noise cancellation level index adjustment module. A user may manually select different noise cancellation modes in the control interface of the APP, for example, may select an active noise cancellation function. In this case, a specific noise cancellation parameter is selected by rotating an indication button of the noise cancellation level index adjustment module. Alternatively, a "subway mode", an "airplane mode", or a "street mode" is manually selected. Optionally, different modes may be selected by using the button, or may be selected by using a drop-down menu. This is not limited in this embodiment of this application.

According to the active noise cancellation headset provided in this embodiment of this application, a noise cancellation level and a noise cancellation parameter that are adaptive to a magnitude or feature information an ambient noise are autonomously determined by detecting the magnitude or the feature information of the ambient noise. In this way, a noise cancellation effect is more flexible and an effect is better.

An embodiment of this application further provides a headset for adjusting an equalization (EQ) function of a downlink signal. The EQ function is to adjust a played music signal, so that a frequency feature of the signal is balanced or some frequency bands are more prominent. Due to different matching degrees, music features heard by a human ear change correspondingly. Therefore, in this embodiment of this application, according to this principle, equalization adjustment is performed on a played downlink audio signal based on a matching degree, and an audio feature change caused by leakage is compensated through corresponding compensation, to reduce audio distortion caused by leakage, so that an audio signal heard by a user is closer to an original audio signal.

For example, the headset shown in FIG. 2 and FIG. 6 may have a downlink EQ function. In this case, because the headset does not have an error microphone, a noise cancellation level index is manually set by the user in a control interface of an APP and sent to a transceiver of the headset through a Bluetooth link. A main control unit is configured to select a corresponding equalization filtering coefficient from an equalization parameter library based on the noise cancellation level index received by the transceiver. In this case, there is a correspondence between the noise cancellation level index and the noise cancellation parameter, and there is a correspondence between the noise cancellation level index and the equalization parameter. The correspondence between the noise cancellation level index and the noise cancellation parameter is stored in a noise cancellation parameter library, and the correspondence between the noise cancellation level index and the equalization parameter is stored in the equalization parameter library. Both the equalization parameter library and the noise cancellation parameter library are stored in a memory, and the equalization parameter library is obtained through statistics collection based on relationships between the matching degree and equalization parameters.

A noise cancellation processing circuit further includes an equalization filter. The MCU writes the selected equalization filtering coefficient into a position corresponding to the equalization filtering coefficient, to configure the equalization filter, and the equalization filter adjusts EQ of the played downlink audio signal based on the equalization parameter.

Figure 15:
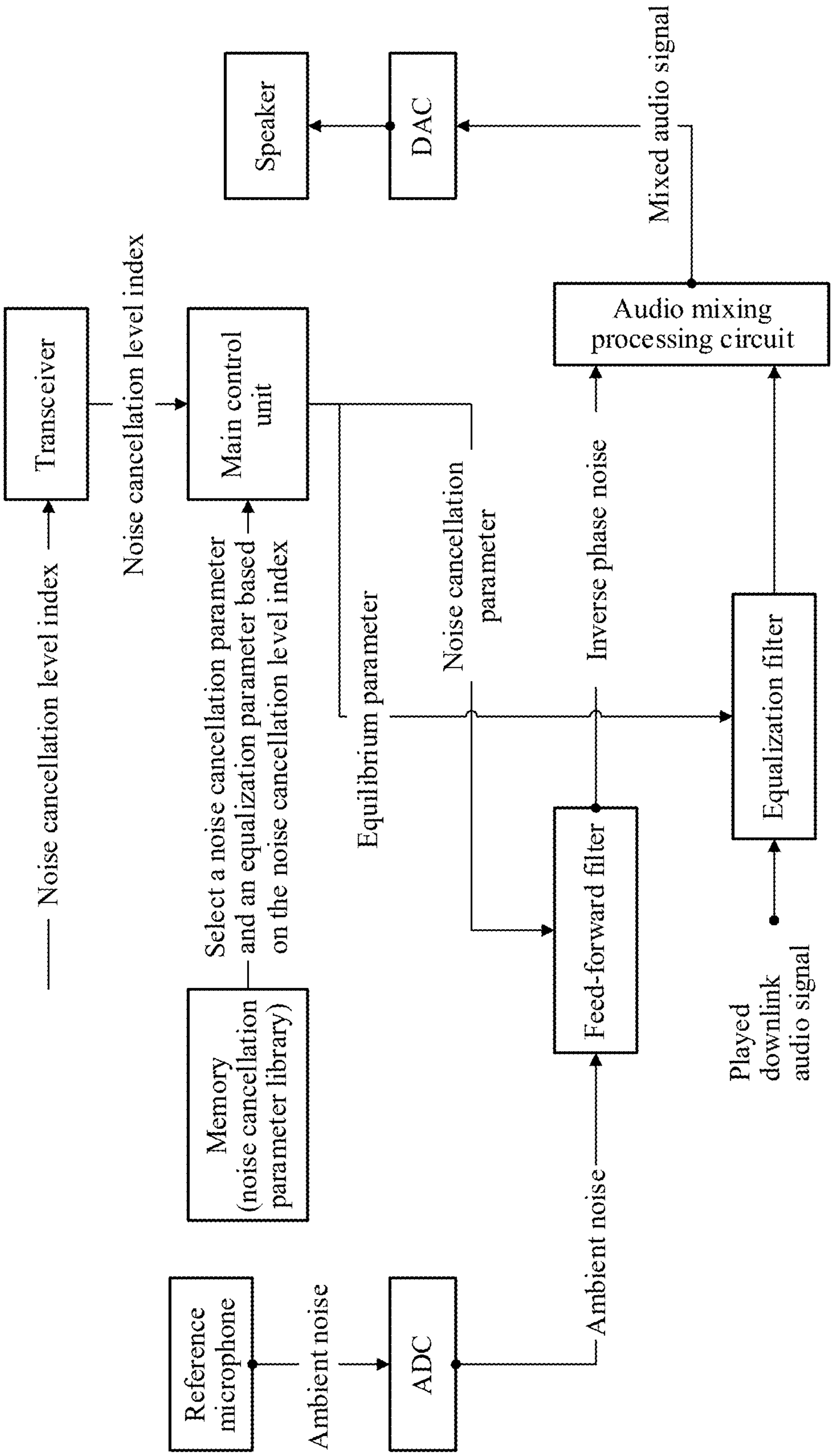
FIG. 15 is a signal flow direction diagram of an example method for performing EQ adjustment on a played downlink audio signal according to an embodiment of this application.

FIG. 15 is a signal flow direction diagram of a method for performing EQ adjustment on a played downlink audio signal by a headset without an error microphone.

Compared with the method shown in FIG. 5, the method adds a step of performing EQ adjustment on the played downlink audio signal. Specifically, a main control unit selects a corresponding noise cancellation parameter and a corresponding equalization parameter based on a noise cancellation level index obtained by a transceiver. The MCU writes the noise cancellation parameter into a position corresponding to a feed-forward filtering coefficient, and writes the equalization parameter into a position corresponding to an equalization filtering coefficient. The feed-forward filter performs filtering processing on an ambient noise based on the noise cancellation parameter to obtain an inverse phase noise. The equalization filter performs EQ processing on the played downlink audio signal based on the equalization parameter to obtain an EQ-processed played downlink audio signal. An audio mixing processing circuit performs audio mixing on the inverse phase noise and the EQ-processed played downlink audio signal to obtain a mixed audio signal. The mixed audio signal is played by using a speaker and reaches an ear canal of a user, and an audio signal heard by the user undergoes both noise cancellation processing and equalization processing. For other steps, refer to descriptions in the embodiment corresponding to FIG. 5. Details are not described herein again.

For example, the headset shown in FIG. 11 has a downlink EQ function. In this case, the headset has an error microphone. A noise cancellation level index is obtained by the headset by measuring a matching degree feature value, and the MCU is configured to select a corresponding equalization parameter from an equalization parameter library based on the noise cancellation level index. There is a correspondence between the noise cancellation level index determined based on the matching degree feature value and the noise cancellation parameter, and a correspondence between the noise cancellation level index determined based on the matching degree feature value and the equalization parameter. The correspondence between the noise cancellation level index and the noise cancellation parameter is stored in a noise cancellation parameter library, and the correspondence between the noise cancellation level index and the equalization parameter is stored in the equalization parameter library. Both the equalization parameter library and the noise cancellation parameter library are stored in a memory.

A noise cancellation processing circuit further includes the equalization filter. The MCU writes the selected equalization filtering coefficient into the position corresponding to the equalization filtering coefficient, to configure the equalization filter, and the equalization filter adjusts EQ of the played downlink audio signal based on the equalization parameter.

Figure 16:
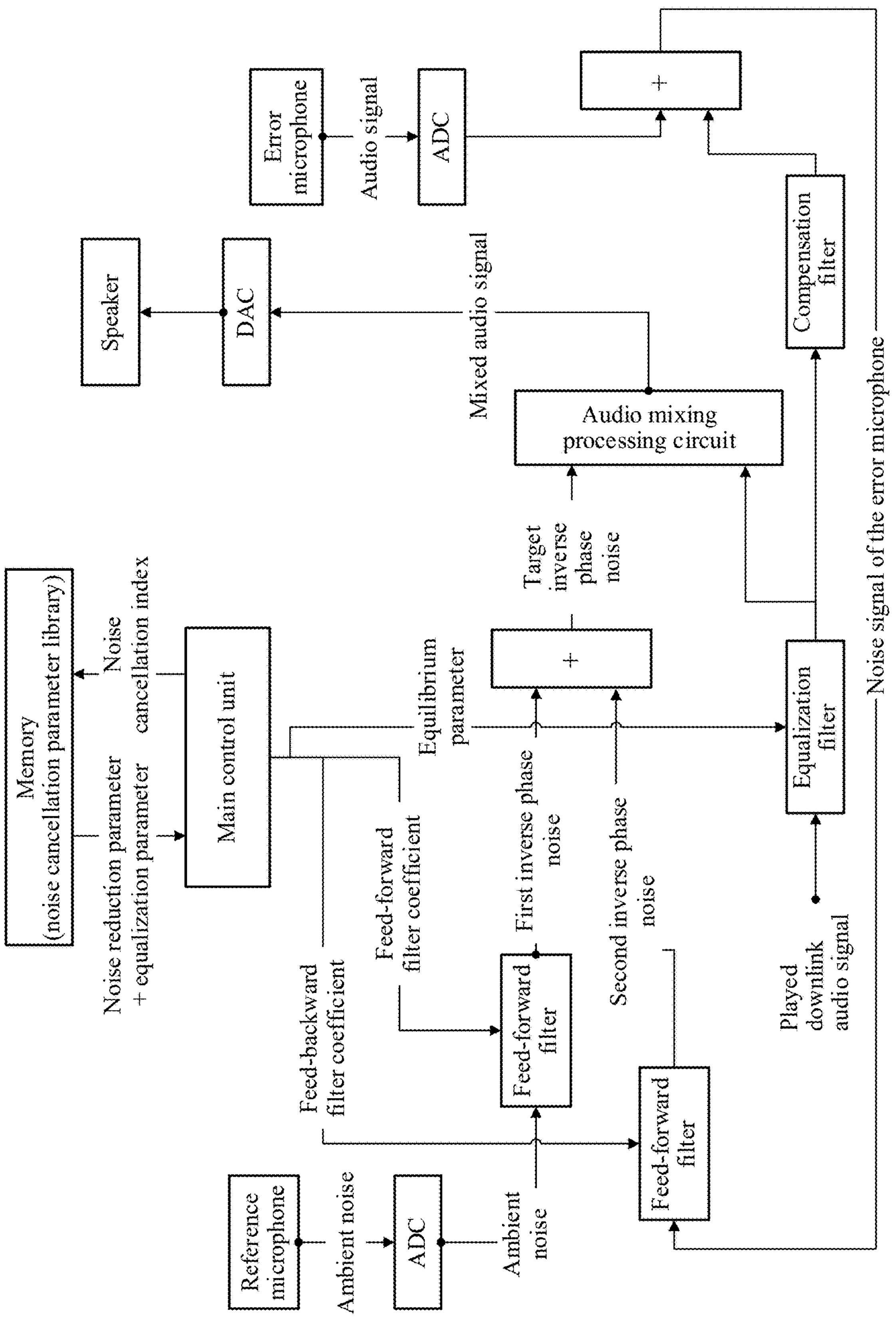
FIG. 16 is a signal flow direction diagram of another example method for performing EQ adjustment on a played downlink audio signal according to an embodiment of this application.

FIG. 16 is a signal flow direction diagram of a method for performing EQ adjustment on a played downlink audio signal by a headset with an error microphone.

Compared with the method shown in FIG. 12, the method adds a step of performing EQ adjustment on the played downlink audio signal. Specifically, a main control unit selects a corresponding noise cancellation parameter based on a noise cancellation level index obtained by a transceiver.

The main control unit further selects an equalization parameter from an equalization parameter library based on the noise cancellation level index, and further, the MCU writes the equalization parameter into a position corresponding to an equalization filtering coefficient.

The equalization filter performs EQ processing on the played downlink audio signal based on the equalization parameter to obtain an EQ-processed played downlink audio signal.

Audio mixing is performed on the EQ-processed played downlink audio signal obtained after being processed by a compensation filter and an audio signal obtained by the error microphone to obtain a noise signal of the error microphone.

After the noise signal of the error microphone is processed by an FB filter, a second inverse phase noise is obtained.

A first inverse phase noise and the second inverse phase noise are superposed to obtain a target inverse phase noise, where a method for obtaining the first inverse phase noise is the same as the method shown in FIG. 12.

After the target inverse phase noise and the EQ-processed played downlink audio signal pass through an audio mixing processing circuit, a mixed audio signal is obtained. For other steps, refer to descriptions in the embodiment corresponding to FIG. 12. Details are not described herein again.

The mixed audio signal is played by using a speaker and reaches an ear canal of a user. An audio signal heard by the user undergoes both noise cancellation processing and equalization processing. This not only eliminates impact of an ambient noise, but also compensates for audio distortion caused by leakage, so that the audio signal heard by the user is closer to an original audio signal.

Figure 17:
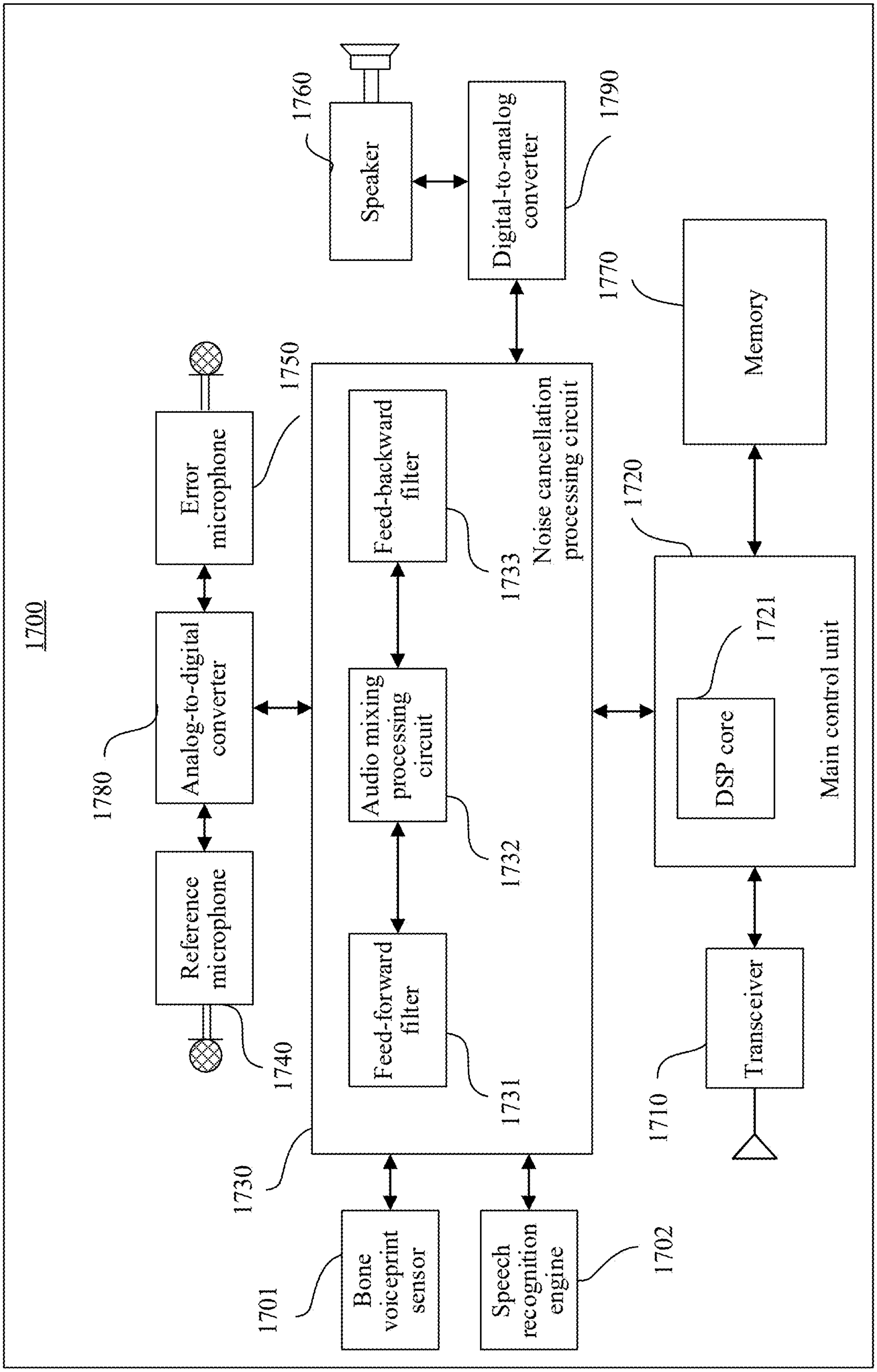
FIG. 17 is a schematic diagram of a structure of another example headset according to an embodiment of this application.

FIG. 17 is a schematic diagram of a structure of another example headset 1700 according to an embodiment of this application.

The headset 1700 includes a transceiver 1710, a main control unit 1720, a noise cancellation processing circuit 1730, a reference microphone 1740, an error microphone 1750, and a speaker 1760. Optionally, the headset 1700 further includes a bone voiceprint sensor 1701, a speech recognition engine 1702, a memory 1770, an ADC 1780, and a DAC 1790. The noise cancellation processing circuit 1730 includes a feed-forward filter 1731, a feed-backward (FB) filter 1733, and an audio mixing processing circuit 1732. The main control unit 1720 further includes a DSP core 1721. In an optional case, the foregoing parts of the headset 1700 are coupled by using connectors. It should be understood that, in the embodiments of this application, coupling refers to mutual connection in a specified manner, including indirect connection by using another device or direct connection. For example, the parts may be connected through various interfaces, transmission lines, buses, or the like. These interfaces are usually electrical communication interfaces, but it is not excluded that the interfaces may be mechanical interfaces or interfaces in another form. This is not limited in this embodiment.

Compared with the headset shown in FIG. 11, the bone voiceprint sensor 1701 and the automatic speech recognition (ASR) engine 1702 are added to the headset shown in FIG. 17. For functions of other parts, refer to descriptions in the embodiment corresponding to FIG. 11. Details are not described herein again.

The bone voiceprint sensor 1701 is configured to obtain a bone voiceprint feature of a user, where the bone voiceprint feature is used to identify an identity of the user.

The user performs bone voiceprint registration when wearing the headset. For example, the user makes a sound when wearing the headset, and the bone voiceprint sensor 1701 obtains sound information of the user, and extracts a bone voiceprint feature based on the sound information. The bone voiceprint feature is bound to the user and stored in the memory 1770 of the headset. If the user selects a noise cancellation parameter, a hear through parameter, or an equalization parameter, or the headset autonomously determines a noise cancellation parameter, a hear through parameter, or an equalization parameter based on a matching degree feature value, the main control unit 1720 binds the noise cancellation parameter, the hear through parameter, or the equalization parameter to the user. For example, the noise cancellation parameter, the hear through parameter, or the equalization parameter may be bound to a bone voiceprint of the user. When the user wears the headset again, the headset may identify the user by using the bone voiceprint feature, and automatically use the noise cancellation parameter, the hear through parameter, or the equalization parameter bound to the user.

Specifically, after the bone voiceprint sensor 1701 obtains the bone voiceprint feature of the user, the MCU 1720 is configured to: determine a historical parameter associated with the bone voiceprint feature of the user, where the historical parameter may include the noise cancellation parameter, the hear through parameter, the equalization parameter, or the like; and determine the historical parameter as a target noise cancellation parameter, a target hear through parameter, or a target equalization parameter.

The ASR engine 1702 is configured to recognize a voice command of the user.

The voice command of the user may include a control command (including a command for switching enabling or disabling and switching a mode) for an active noise cancellation function, a hear through function, or an equalization function, for example, may include key words such as "enabling the active noise cancellation function", "disabling the active noise cancellation function", "switching to an airplane mode", and "setting a noise cancellation level index to 10". Details are not enumerated herein.

After the ASR engine 1702 recognizes the voice command of the user, the MCU 1720 controls the noise cancellation processing circuit 1730 to perform corresponding processing.

The user may further reset a noise cancellation parameter by using the ASR engine 1702, to implement a personalized setting that complies with the user. Voice-based control is more convenient and convenient, and can further improve user experience.

The headset shown in FIG. 2 and FIG. 6 may also include a bone voiceprint sensor and an ASR engine. For functions of the bone voiceprint sensor and the ASR engine, refer to descriptions in the embodiment corresponding to FIG. 17. Details are not described herein again.

Figure 18:
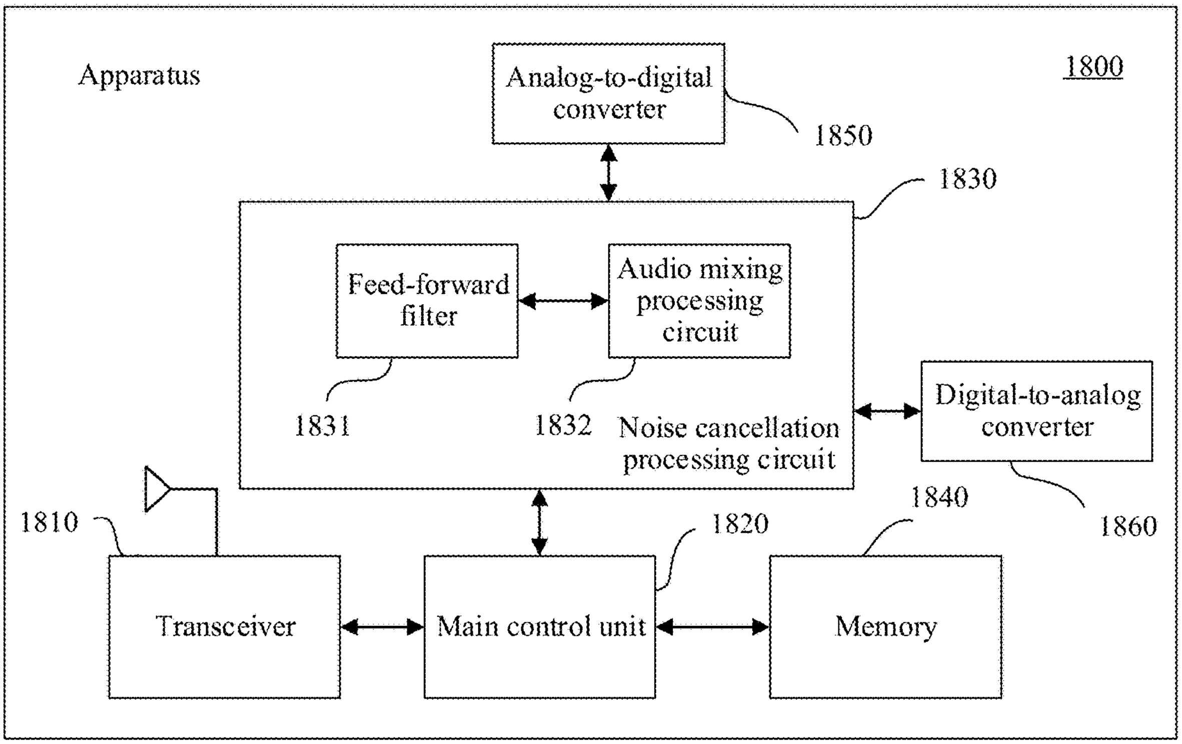
FIG. 18 is a schematic diagram of a structure of an example noise cancellation apparatus according to an embodiment of this application.

An embodiment of this application further provides an active noise cancellation apparatus 1800, as shown in FIG. 18. For example, the apparatus may be a headset processor chip. The apparatus includes a transceiver 1810, a main control unit 1820, a noise cancellation processing circuit 1830, a memory 1840, an ADC 1850, and a DAC 1860. For example, the noise cancellation processing circuit 1830 includes a feed-forward filter 1831 and an audio mixing processing circuit 1832. In an optional case, the foregoing parts of the apparatus 1800 are coupled by using connectors. For example, the parts may be coupled through various interfaces, transmission lines, buses, or the like. These interfaces are usually electrical communication interfaces, but it is not excluded that the interfaces may be mechanical interfaces or interfaces in another form. This is not limited in this embodiment.

For functions of the parts of the active noise cancellation apparatus 1800, refer to descriptions of corresponding parts of the headset 200. For example, for the transceiver 1810, refer to descriptions of the transceiver 250. For the main control unit 1820, refer to descriptions of the main control unit 230. Details are not enumerated herein.

Figure 19:
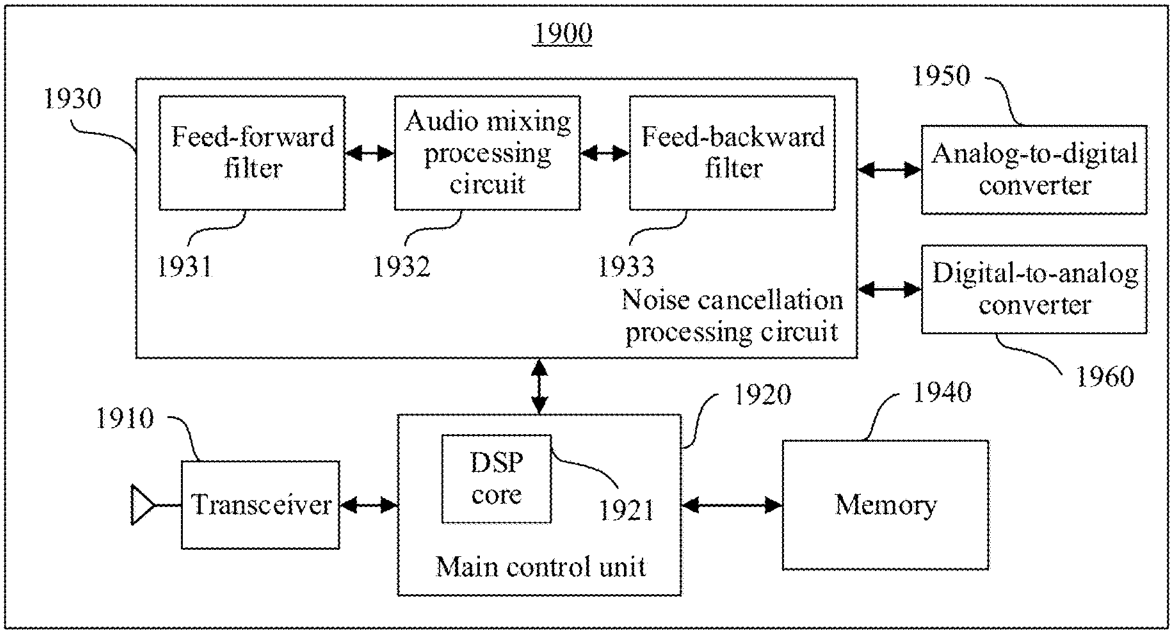
FIG. 19 is a schematic diagram of a structure of another example noise cancellation apparatus according to an embodiment of this application.

FIG. 19 shows another active noise cancellation apparatus 1900 according to an embodiment of this application. For example, the apparatus may be a headset processor chip. The apparatus 1900 includes a transceiver 1910, a main control unit 1920, a noise cancellation processing circuit 1930, a memory 1940, an ADC 1950, and a DAC 1960. For example, the noise cancellation processing circuit 1930 includes a feed-forward filter 1931, an audio mixing processing circuit 1932, and a feed-backward filter 1933. The main control unit 1920 may further include a DSP core 1921. In an optional case, the foregoing parts of the apparatus 1900 are coupled by using connectors. For example, the parts may be coupled through various interfaces, transmission lines, buses, or the like. These interfaces are usually electrical communication interfaces, but it is not excluded that the interfaces may be mechanical interfaces or interfaces in another form. This is not limited in this embodiment.

For functions of the parts of the active noise cancellation apparatus 1900, refer to descriptions of corresponding parts of the headset 1100. For example, for the transceiver 1910, refer to descriptions of the transceiver 1110. For the main control unit 1920, refer to descriptions of the main control unit 1120. Details are not enumerated herein.

In an optional case, an embodiment of this application further provides a noise cancellation headset control method. The method includes: presenting an input interface, and providing a noise cancellation level adjustment module in the input interface, where the noise cancellation level adjustment module includes indications of a plurality of non-uniformly arranged noise cancellation level indexes, and an interval between indications of adjacent noise cancellation level indexes is related to an adjustment step between noise cancellation levels; receiving a switch control signal by using a noise cancellation control switch, where the switch control signal is a signal for setting enabling or disabling of a noise cancellation function of the noise cancellation headset by a user; and receiving, by using the noise cancellation level adjustment module, a setting performed by the user on a noise cancellation level index, where the noise cancellation level index is used to indicate a noise cancellation level of the noise cancellation headset.

In a possible implementation, the method further includes: when the switch control signal is the signal for setting enabling or disabling of the noise cancellation function of the noise cancellation headset by the user, determining the noise cancellation level index based on the setting performed by the user on the noise cancellation level index, and determining a target noise cancellation parameter from a noise cancellation parameter library based on the noise cancellation level index; and obtaining a target inverse phase noise based on the target noise cancellation parameter, where the target inverse phase noise is used to reduce or cancel an ambient noise obtained by a reference microphone.

In a possible implementation, the method further includes: performing audio mixing processing on a played downlink audio signal and the inverse phase noise to obtain a mixed audio signal, where the mixed audio signal is played by using a speaker.

In a possible implementation, the method further includes: sending the switch control signal and the noise cancellation level index to the noise cancellation headset through a wireless link, so that the noise cancellation headset enables or disables the noise cancellation function based on the switch control signal, and adjusts the noise cancellation level of the headset based on the noise cancellation level index.

In a possible implementation, a hear through control switch and a hear through level adjustment module are further provided in the input interface. The method further includes: receiving a second switch control signal by using the hear through control switch, where the second switch control signal is a signal for setting enabling or disabling of a hear through function of the noise cancellation headset by the user; and receiving, by using the hear through level adjustment module, a setting performed by the user on a hear through level index, where the hear through level index is used to indicate a hear through parameter of the noise cancellation headset.

In a possible implementation, an automatic mode control switch and a plurality of noise cancellation scenario mode control switches are further provided in the input interface. The method further includes: receiving a third switch control signal by using the automatic mode control switch, where the third switch control signal is a signal for setting enabling or disabling of an automatic noise cancellation mode of the noise cancellation headset by the user; and receiving, by using any control switch in the plurality of noise cancellation scenario mode control switches, a signal for setting enabling or disabling of a noise cancellation scenario mode corresponding to the any control switch, where when the automatic mode control switch is turned on, the plurality of noise cancellation mode control switches do not take effect.

The chip in the embodiments of this application is a system manufactured on a same semiconductor substrate by using an integrated circuit technology, and is also referred to as a semiconductor chip. The chip may be a set of integrated circuits formed on the substrate (which is usually a semiconductor material such as silicon) by using the integrated circuit technology, and an outer layer of the chip is usually packaged with a semiconductor packaging material. The integrated circuit may include various types of functional devices. Each type of functional device includes a logic gate circuit, a metal-oxide-semiconductor (MOS) transistor, or a transistor such as a bipolar transistor or a diode, and may alternatively include another component such as a capacitor, a resistor, or an inductor. Each functional device may operate independently or operate after being driven by necessary driver software, and may implement various functions such as communication, operation, or storage.

An embodiment of this application further provides a computer-readable storage medium. The computer-readable storage medium stores instructions. When the instructions are run on a computer or a processor, the computer or the processor is enabled to perform one or more steps according to any one of the foregoing methods. When the modules of the foregoing signal processing apparatus are implemented in a form of a software functional unit and sold or used as an independent product, the component modules may be stored in the computer-readable storage medium.

Based on such an understanding, an embodiment of this application further provides a computer program product including instructions. When the computer program product runs on a computer or a processor, the computer or the processor is enabled to perform any method provided in the embodiments of this application. The technical solutions of this application essentially, or the part contributing to the conventional technology, or all or some of the technical solutions may be implemented in a form of a software product. The computer software product is stored in a storage medium, and includes several instructions for instructing a computer device or a processor in a computer device to perform all or some of the steps of the methods in the embodiments of this application.

The embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application. For example, for some specific operations in an apparatus embodiment, refer to the foregoing method embodiments.

What is claimed is:

1. A noise cancellation apparatus, comprising:

a main control unit (MCU);

a reference microphone;

an error microphone;

a speaker; and a noise cancellation processing circuit coupled to the MCU, the reference microphone, the error microphone, and the speaker, wherein the MCU is configured to determine a target noise cancellation parameter based on a matching degree feature value, and the matching degree feature value is related to a matching degree between a headset and an ear canal of a user, wherein the noise cancellation processing circuit is configured to obtain a target inverse phase noise based on the target noise cancellation parameter, and the target inverse phase noise is used to reduce or cancel an ambient noise obtained by a reference microphone, wherein the noise cancellation processing circuit is further configured to perform audio mixing processing on a played downlink audio signal and the inverse phase noise to obtain a mixed audio signal, and the mixed audio signal is played by using the speaker, and wherein a distance between the error microphone and the speaker is a first distance, a distance between the reference microphone and the speaker is a second distance, and the first distance is less than the second distance.

2. The noise cancellation apparatus according to claim 1, wherein the MCU is further configured to determine a target equalization parameter, and wherein the noise cancellation processing circuit is further configured to adjust equalization EQ of the played downlink audio signal based on the target equalization parameter.

3. The noise cancellation apparatus according to claim 1, further comprising:

a bone voiceprint sensor, configured to obtain a bone voiceprint feature of the user, wherein the MCU is further configured to:

associate the target noise cancellation parameter with the bone voiceprint feature of the user;

determine whether the bone voiceprint feature exists in a historical parameter library; and when the bone voiceprint feature exists in the historical parameter library, determine the historical target noise cancellation parameter associated with the bone voiceprint feature as the target noise cancellation parameter.

4. The noise cancellation apparatus according to claim 1, further comprising:

a speech recognition engine, configured to recognize a voice command, wherein the MCU is further configured to:

when the speech recognition engine recognizes the voice command, determine the target noise cancellation parameter based on the voice command, or when the speech recognition engine recognizes the voice command, enable or disable a noise cancellation function based on the voice command.

5. The noise cancellation apparatus according to claim 1, wherein the MCU is further configured to determine a target hear through parameter, and the target hear through parameter is related to the matching degree, and wherein the noise cancellation processing circuit is further configured to:

perform, based on the target hear through parameter, hear through processing on an audio signal obtained by the reference microphone to obtain a compensation audio signal of a useful audio signal, wherein the audio signal obtained by the reference microphone comprises the ambient noise and the useful audio signal; and perform audio mixing processing on the played downlink audio signal, the inverse phase noise, and the compensation audio signal to obtain a mixed audio signal.

6. A noise cancellation method implemented by a noise cancellation apparatus having a reference microphone, an error microphone, and a speaker, comprising:

determining a target noise cancellation parameter based on a matching degree feature value, and the matching degree feature value is related to a matching degree between a headset and an ear canal of a user;

obtaining a target inverse phase noise based on the target noise cancellation parameter, wherein the target inverse phase noise is used to reduce an ambient noise obtained by the reference microphone; and performing audio mixing processing on a played downlink audio signal and the inverse phase noise to obtain a mixed audio signal, and the mixed audio signal is played by using the speaker, wherein a distance between the error microphone and the speaker is a first distance, a distance between the reference microphone and the speaker is a second distance, and the first distance is less than the second distance.

7. The method according to claim 6, further comprising:

determining a target equalization parameter; and adjusting equalization EQ of the played downlink audio signal based on the target equalization parameter.

8. The method according to claim 6, further comprising:

obtain a bone voiceprint feature of the user;

associate the target noise cancellation parameter with the bone voiceprint feature of the user;

determine whether the bone voiceprint feature exists in a historical parameter library; and when the bone voiceprint feature exists in the historical parameter library, determine the historical target noise cancellation parameter associated with the bone voiceprint feature as the target noise cancellation parameter.

9. The method according to claim 6, further comprising:
recognizing a voice command;
when the voice command is recognized, determining the target noise cancellation parameter based on the voice command; or
when the voice command is recognized, enabling or disabling a noise cancellation function based on the voice command.

10. The method according to claim 6, further comprising:
determining a target hear through parameter, and the target hear through parameter is related to the matching degree; and
performing, based on the target hear through parameter, hear through processing on an audio signal obtained by the reference microphone to obtain a compensation audio signal of a useful audio signal, wherein the audio signal obtained by the reference microphone comprises the ambient noise and the useful audio signal; and
performing audio mixing processing on the played downlink audio signal, the inverse phase noise, and the compensation audio signal to obtain a mixed audio signal.

11. A noise cancellation headset control apparatus, comprising:
one or more processors; and
a memory, wherein the memory is configured to store program instructions, and the one or more processors are configured to invoke the program instructions to perform steps of:
presenting an input interface;
providing a noise adjustment module in the input interface, wherein the noise adjustment module comprises indications of a plurality of non-uniformly arranged noise cancellation level indexes, and an interval between indications of adjacent noise cancellation level indexes is related to an adjustment step between noise cancellation levels;
receiving a switch control signal, wherein the switch control signal is used for setting enabling or disabling of a noise cancellation function of a noise cancellation headset; and
receiving, by using the noise adjustment module, a setting on a noise cancellation level index, wherein the noise cancellation level index is used to indicate a noise cancellation level of the noise cancellation headset.

12. The apparatus according to claim 11, wherein the one or more processors are further configured to invoke the program instructions to perform steps of:
when the switch control signal is the signal for enabling or disabling of the noise cancellation function of the noise cancellation headset, determining the noise cancellation level index based on the setting on the noise cancellation level index;
determining a target noise cancellation parameter from a noise cancellation parameter library based on the noise cancellation level index; and
obtaining a target inverse phase noise based on the target noise cancellation parameter, wherein the target inverse phase noise is used to reduce or cancel an ambient noise obtained by a reference microphone.

13. The apparatus according to claim 11, wherein the one or more processors are further configured to invoke the program instructions to perform steps of:
performing audio mixing processing on a played downlink audio signal and the inverse phase noise to obtain a mixed audio signal, wherein the mixed audio signal is played by using a speaker.

14. The apparatus according to claim 11, wherein the one or more processors are further configured to invoke the program instructions to perform steps of:
sending the switch control signal to the noise cancellation headset through a wireless link, so that the noise cancellation headset enables or disables the noise cancellation function based on the switch control signal.

15. The apparatus according to claim 11, wherein the one or more processors are further configured to invoke the program instructions to perform steps of:
sending the noise cancellation level index to the noise cancellation headset through a wireless link; and
adjusting the noise cancellation level of the headset based on the noise cancellation level index.

16. The apparatus according to claim 11, wherein the one or more processors are further configured to invoke the program instructions to perform steps of:
providing a hear through control switch in the input interface; and
receiving a second switch control signal by using the hear through control switch, wherein the second switch control signal is used for setting enabling or disabling of a hear through function of the noise cancellation headset.

17. The apparatus according to claim 16, wherein the one or more processors are further configured to invoke the program instructions to perform steps of:
providing a hear through level adjustment module in the input interface;
receiving, by using the hear through level adjustment module, a setting on a hear through level index, wherein the hear through level index is used to indicate a hear through parameter of the noise cancellation headset.

18. The apparatus according to claim 11, wherein the one or more processors are further configured to invoke the program instructions to perform steps of:
providing an automatic mode control switch in the input interface;
receiving a third switch control signal by using the automatic mode control switch, wherein the third switch control signal is used for enabling or disabling of an automatic noise cancellation mode of the noise cancellation headset.

19. The apparatus according to claim 18, when the automatic mode control switch is turned on, and a plurality of noise cancellation mode control switches do not take effect.

20. The apparatus according to claim 11, wherein the one or more processors are further configured to invoke the program instructions to perform steps of:
providing a plurality of noise cancellation scenario mode control switches in the input interface; and
receiving a signal for enabling or disabling of a noise cancellation scenario mode corresponding to the any control switch.

* * * * *